United States Patent

Kawamoto

[11] Patent Number: 5,496,687
[45] Date of Patent: *Mar. 5, 1996

[54] PHOTOGRAPHIC FILM-INCORPORATED CAMERA

[75] Inventor: Fumio Kawamoto, Kanagawa, Japan

[73] Assignee: Fuji Photo Film Co., Ltd., Kanagawa, Japan

[*] Notice: The term of this patent shall not extend beyond the expiration date of Pat. No. 5,326,689.

[21] Appl. No.: 398,042

[22] Filed: Mar. 2, 1995

Related U.S. Application Data

[63] Continuation of Ser. No. 177,072, Jan. 3, 1994, abandoned.

[30] Foreign Application Priority Data

Jan. 4, 1993 [JP] Japan .................. 5-000082
Mar. 11, 1993 [JP] Japan .................. 5-050806

[51] Int. Cl.⁶ .................................... G03C 1/76
[52] U.S. Cl. ................ 430/496; 430/495.1; 430/501; 430/347; 430/930; 430/939; 430/349; 430/533; 264/210.5; 264/210.7; 242/348; 242/348.2
[58] Field of Search ............... 430/495, 496, 430/501, 347, 930, 939, 349, 533; 264/210.5, 210.7; 242/348, 348.2

[56] References Cited

U.S. PATENT DOCUMENTS

| | | | |
|---|---|---|---|
| 3,728,124 | 4/1973 | Whyte | 430/533 |
| 3,822,132 | 7/1974 | Hunter | 430/533 |
| 3,853,807 | 4/1973 | Hunter | 260/40 R |
| 4,066,814 | 1/1978 | Chiklis | 430/533 |
| 4,141,735 | 2/1979 | Schrader et al. | 430/496 |
| 4,884,087 | 11/1989 | Mochida et al. | 354/75 |
| 5,071,736 | 12/1991 | Ikenoue et al. | 430/533 |
| 5,096,803 | 3/1992 | Kanetake et al. | 430/349 |
| 5,290,661 | 3/1994 | Idota et al. | 430/607 |
| 5,326,689 | 7/1994 | Murayama | 430/530 |
| 5,368,997 | 11/1994 | Kawamoto | 430/523 |

FOREIGN PATENT DOCUMENTS

| | | |
|---|---|---|
| 0387015 | 9/1990 | European Pat. Off. |
| 0466417 | 1/1992 | European Pat. Off. |
| 1937527 | 4/1970 | Germany. |

Primary Examiner—Charles L. Bowers, Jr.
Assistant Examiner—Mark F. Huff
Attorney, Agent, or Firm—Sughrue, Mion, Zinn, Macpeak & Seas

[57] ABSTRACT

A photographic film-incorporated camera which comprises a supply room in which an unexposed photographic film drawn from a cylindrical cartridge has been wound up and a wind-up room with which the cylindrical cartridge is enclosed, and which is designed to feed one exposure of the photographic film drawn from the supply room per a shooting to wind up in the cylindrical cartridge. The photographic film comprises a photographic layer on a composite of a support and a subbing layer. The composite is obtained by subjecting the support which comprises an aromatic polyester having a glass transition temperature of 50° to 200° C. to heat treatment at a temperature of 40° C. to the glass transition temperature for 0.1 to 1,500 hours before or after forming the subbing layer on the support.

8 Claims, 1 Drawing Sheet

PHOTOGRAPHIC FILM-INCORPORATED CAMERA

This is a continuation of application Ser. No. 08/177,072 filed Jan. 3, 1994 (abandoned).

FIELD OF THE INVENTION

The present invention relates to a photographic film-incorporated camera, known as a disposable camera, in which the photographic film is particularly improved in a core-set curling tendency.

BACKGROUND OF THE INVENTION

A photographic material is generally produced by coating one or more photographic layer (light-sensitive layer) on a plastic film support. As the plastic film support, celluloses such as triacetyl cellulose (hereinafter referred to as "TAC") or polyesters such as polyethylene terephthalate (hereinafter referred to as "PET").

A photographic material is generally classified into two groups: a film in the form of a sheet such as an X-ray film, a film for photomechanical process or a cut film; and a film in the form of a roll such as a color or black-and-white film having a width of 35 mm or less which is incorporated into a cylindrical cartridge (patrone). The latter film is usually employed by charging in a camera for shooting. Recently, the film has been employed by incorporating in a camera as a disposable camera.

TAC is mainly employed as a material of a support for a roll film TAC has the features of high transparency and no optical anisotropy. Furthermore, the curl in a TAC film introduced during development is easily smoothed.

In contrast, when a photographic material having a support which does not have as good a curl smoothening property as TAC is used in the form of roll, scratching and poor focus occur during the printing step of forming an image on a photographic printing paper, or jamming occurs during feeding of the film in the printing step.

Of the photographic materials other than TAC, PET has excellent productivity, mechanical strength such as bending strength and dimension stability. Thus, PET has heretofore been considered to be substitutable for TAC. However, when PET is employed as a support of a photographic material, the resulting support film exhibits a strong curling tendency and the strong curl remains even after development. It is difficult to pull out a curved film by its edge from a patrone, and handling of the curved film after development is also difficult. Thus, the use of the PET in the field of photographic materials has been restricted, despite the above-mentioned excellent properties.

Photographic materials have been developed for a variety of applications. For instance, increase in feeding speed of a photographic film in a camera per each shooting, increase in image magnification and reduction in size of the camera have been desired. The desired characteristics can be obtained by use of a support having high bending strength, good dimensional stability and reduced thickness.

In a photographic film-incorporated camera (disposable camera), the above characteristics, particularly reduction in size of the camera, is desired. To satisfy this need, a diameter of a spool or vacant core of a wound up film in a supply room as well as a size of the cylindrical cartridge (patrone) must be reduced.

There are two problems to be solved in order to attain the size-reduction of the patrone:

One of the problems resides in the reduction of the modulus of elasticity in bending (concerned with brittleness) with reducing the thickness of the film.

The second problem resides in a strong curl tendency developed with elapse of time due to the reduction of the size of the spool (of the cartridge). In the conventional 135 system device, a roll film for 36 frames which is charged in the cartridge has a diameter of 14 mm as the smallest one. If the diameter is desired to be 12 mm or less, or further 9 mm or less, a high curl tendency is produced in the roll film to bring about various troubles in handling of the exposed film (roll film). For instance, if the exposed film taken out from a small-sized cartridge is developed in a mini-laboratory automatic developing machine, the film is curled up during handling in the machine to cause "uneven development". In more detail, the film is fixed to a leader at only one edge but not fixed at the other edge so that the film is curled up because of its high curl tendency, and therefore the developing solution is not sufficiently fed to the curled area of the film to cause the uneven development. Further, the curled portion of the film is crushed by a roller in the machine to be broken.

For the above reason, the photographic film-incorporated camera is available only as a 12-exposure film or a 24-exposure film. The 24-exposure film is usually wound around a vacant core of a diameter of 14 mm in a supply room. A photographic film-incorporated camera having a 36-exposure film is not available although it is desired.

As described above, in order to obtain such a photographic film-incorporated camera, the reduction of the bending strength with reducing the thickness of the film and the strong curl tendency which renders operation of pulling out the film edge (film-tongue-end pulling out operation) difficult are required to be improved.

U.S. Pat. No. 4,141,735 discloses a process for reducing core-set curling tendency and core-set curl of polymeric film elements (polyester such as PET) which comprises heating a sheet or roll of self-supporting, core-set-prone thermoplastic polymeric film, at a temperature in the temperature range of from about 30° C. up to about. The glass transition temperature (Tg) of said polymer for 0.1 to 1500 hours. To reduce core-set curling tendency, the patent mainly uses PET film having excellent productivity, mechanical strength and dimension stability as described above.

In more detail, the PET film is extruded at 200° C. or higher to be subjected to a heat treatment. In such heat treatment, the heated film usually is first stretched lengthwise 2 to 3 times its original length, and then similarly stretched widthwise. The stretching, which is known also as "cold drawing", is carried out at temperatures below the temperature of melting but above the glass transition temperature of the polymer. The resulting film is referred to as being biaxially-oriented. The cold drawing affects some change in the crystallinity of the polymer. Subsequently, to enhance the crystallinity and to increase the dimensional stability of the film, the biaxially-oriented polymeric film is "heated-set" by heating it near its crystallization point, while maintaining it under constant tension. The heating and tensioning also ensure that the heat-set film remains transparent upon cooling. The directionally oriented and heat-set film is then conventionally subjected to a subsequent heat treatment known as a "heat-relax" treatment. The heat-relax treatment is performed at approx. the creep temperature of the polymer (PET: 130° C.). The use of the heat-relax treatment in such a overall continuous processes results in a still further improvement in the dimensional stability and surface smoothness of the finished film.

In the U.S. Pat. No. 4,141,735, the finished film is further subjected to the above-described heat treatment to reduce core-set curling tendency.

However, even if the film subjected to the heat treatment in the patent is employed for the photographic film-incorporated camera, the resultant camera is not sufficiently improved in the curling tendency. In more detail, a roll film for 36 frames used in the conventional 135 system device has a diameter (of spool) of 14 mm as the smallest one, while a roll film used in the photographic film-incorporated camera is desired to have a diameter smaller than 14 mm, preferably not larger than 12 mm. Hence, the roll film used in the photographic film-incorporated camera is further required to enhance bending strength and brittleness, i.e., property that there is no occurrence of both bending after keeping bending state and breaking by bending.

Further, the photographic film-incorporated camera requires handling of pulling out the film edge (film-tongue-end) because the edge is perfectly incorporated in the cartridge (patrone), which differs from a conventional camera. Therefore, the photographic film-incorporated camera needs to be further improved in the curling tendency compared with one of the conventional camera.

SUMMARY OF THE INVENTION

It is an object of the present invention to provide a photographic film-incorporated camera which is improved in film-tongue-end (film edge) pulling out operation, an uneven development and occurrence of scratching and out-of-focusing during the printing step, which are originated from a high curling tendency of the photographic film.

It is another object of the present invention to provide a photographic film-incorporated camera in which the size of the cartridge is reduced.

There is provided by the present invention a photographic film-incorporated camera comprising a supply room in which an unexposed photographic film drawn from a cylindrical cartridge has been wound up and a wind-up room with which the cylindrical cartridge is enclosed, one exposure of the photographic film drawn from the supply room being fed per a shooting to be wound up in the cylindrical cartridge; wherein the photographic film comprises a photographic layer on a composite of a support and a subbing layer, said photographic layer being obtained by subjecting the support which comprises an aromatic polyester having a glass transition temperature of 50° to 200° C. to heat treatment at a temperature of 40° C. to the glass transition temperature for 0.1 to 1,500 hours before or after forming the subbing layer on the support.

The support before the heat treatment is preferably stretched in the condition of the stretching magnification of 3.05 to 4.0 in both lengthwise direction and widthwise direction, and the photographic film is preferably wounded around a spool or vacant core of the diameter of 3 to 13.5 mm in the supply room.

In the photographic film-incorporated camera of the invention, the film is enhanced in flexibility and bending strength so that curl formed by set-core (by keeping bending state) and breaking by bending are scarcely produced. Hence, the photographic film-incorporated camera using such film is greatly improved in film-tongue-end pulling out operation and is almost free from an uneven development and occurrence of scratching and out-of-focusing occur during the printing step. Further, by using such film, the size of the cartridge can be reduced, so that the size of a photographic film-incorporated camera can be also reduced.

The photographic film of the invention has the composite obtained by subjecting the above specific polyester of Tg of 50° to 200° C. stretched in the condition of the stretching magnification of 3.05 to 4.0 to the above heat treatment at a temperature of 40° C. to Tg for 0.1 to 1,500 hours. The stretched polyester is stretched in the condition of the stretching magnification larger than the conventional condition, whereby the polyester is enhanced in flexibility without reduction of bending strength and further the performance of the heat treatment allows the support have more improved flexibility and bending strength due to relaxation of strain in the polyester. From the above reason, the polyester film has an enhanced flexibility and bending strength. The combination of the enhanced flexibility and bending strength improves set-core curling tendency.

DETAILED DESCRIPTION OF THE INVENTION

The photographic film-incorporated camera of the invention comprises a supply (feed) room in which an unexposed photographic film drawn from a cylindrical cartridge (patrone) is wound around a spool or wound by itself and a wind-up (winding) room with which the cartridge having no photographic film is enclosed. In more detail, the edge of the photographic film drawn from the cartridge in the wind-up room is connected with the spool (or vacant core) of the supply room to be wound around it. Further, one exposure (frame) of the photographic film drawn from the supply room is fed per a shooting to be wound up in the cartridge.

The photographic film has a basic structure comprising a transparent polyester support, a subbing layer and a silver halide emulsion layer (photographic layer or light-sensitive layer).

Figure 1:
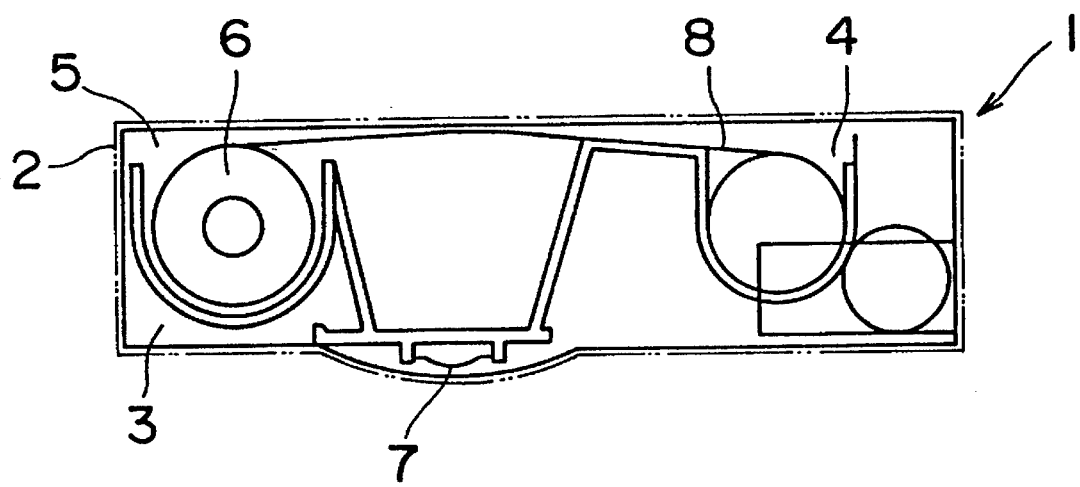
FIG. 1 is a top view showing the inner structure of an example of the photographic film-incorporated camera according to the invention.
Figure 2:
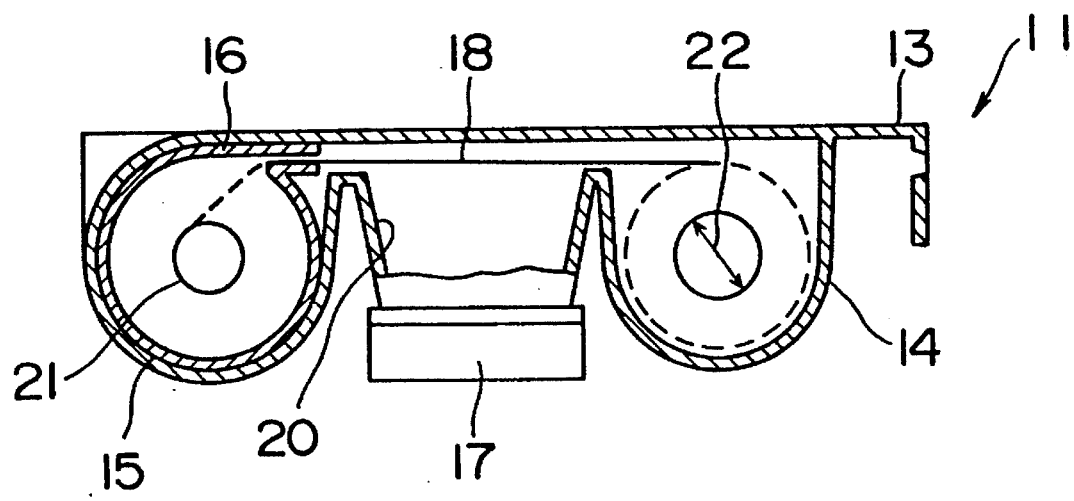
FIG. 2 is a top partially cross-sectional view showing the inner structure of another example of the photographic film-incorporated camera according to the invention.

Representative structures of the camera of the invention are shown in FIGS. 1 and 2.

In FIG. 1, the photographic film-incorporated camera 1 comprises an inner unit 3 enclosed with a outside box 2. In the inner unit 3, an unexposed photographic film 8 drawn from a cylindrical cartridge 6 has been wound up in a supply room 4 and the cylindrical cartridge 6 is enclosed with a wind-up room 5. Per a shooting, one exposure of the photographic film drawn from the supply room is fed to be wound up in the cylindrical cartridge. A reference number "7" is a lens for shooting.

In FIG. 2, the photographic film-incorporated camera 11 comprises an inner unit 13 enclosed with a outside box (not shown). In the unit 13, an unexposed photographic film 18 drawn from a cylindrical cartridge 16 has been wound up around a spool 22 of a supply room 14 and the cylindrical cartridge 16 is enclosed with a wind-up room 15. A reference number "17" is a lens unit. A reference number "20" is an exposure frame. A reference number "21" is a spool.

In the invention, the support of the photographic film is a polyester having an aromatic ring in its structure and Tg of 50° to 200° C. and is stretched in the condition of the stretching magnification of 3.2 to 4.0 in both lengthwise and widthwise directions. Further, the support is subjected to the heat treatment of heating at a temperature of 40° C. to a glass transition temperature for 0.1 to 1,500 hours. The heat treatment may be carried out whether before or after the formation of the subbing layer.

The polyester material of the invention is described below in more detail. The polyester material employed in the invention preferably is one derived mainly from a dibasic acid containing at least a benzene dicarboxylic acid or a naphthalene dicarboxylic acid and glycol containing at least an ethylene glycol, and more preferably is one derived mainly from a benzene dicarboxylic acid and an ethylene glycol or poly(cyclohexanedimethanol terephthalate), and most preferably is poly(ethylene terephthalate) namely PET and poly(ethylene naphthalate), from the viewpoints of core-set curling tendency, bending strength and cost performance.

As materials of the polyester of the invention, the following compounds can be employed.

Examples of dibasic acid includes terephthalic acid, isophthalic acid, phthalic acid, phthalic anhydride, succinic acid, naphthalenedicarboxylic acid, glutaric acid, adipic acid, sebasic acid, succinic anhydride, maleic acid, fumaric acid, maleic anhydride, itaconic acid, citraconic anhydride, tetrahydrophthalic anhydride, diphenylene-p,p-dicarboxylic acid, terachlorophthalic anhydride, 3,6-endomethylenetetrahydrophthalic anhydride, 1,4-cyclohexanedicarboxylic acid,

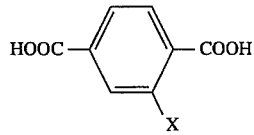

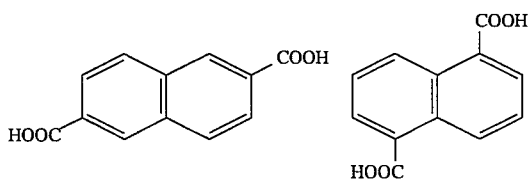

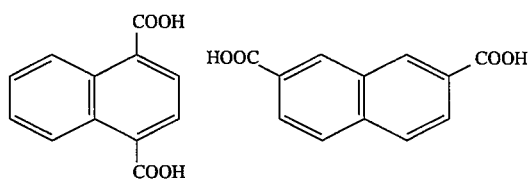

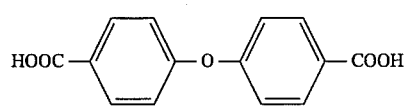

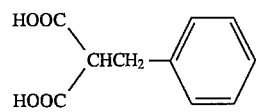

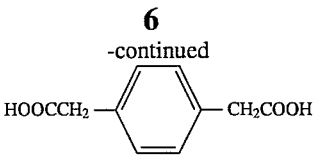

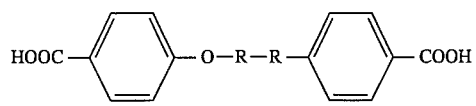

(R: an alkylene group having carbon atoms of 1 to 5)

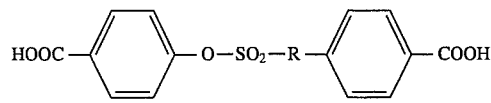

(R: an alkylene group having carbon atoms of 1 to 5)

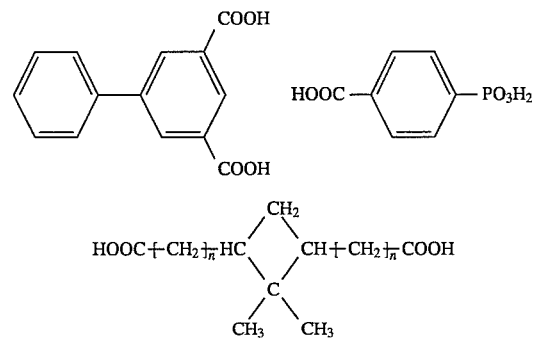

(R: an alkylene group having carbon atoms of 3 to 5)

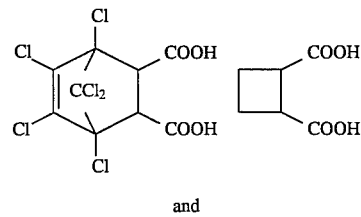

and

The polyester of the invention employs at least one aromatic dicarboxylic acid or anhydride having at least one benzene ring as a dibasic acid ingredient, of the above examples.

Examples of glycol empoyable for the polyester include ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, 1,4-cyclohexanedimethanol, 1,3-dicyclohexanediol, 1,1-cyclohexanedimethanol, catecol, resorcine, hydroquinone, 1,4-benzenedimethanol,

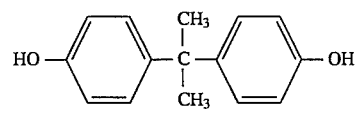

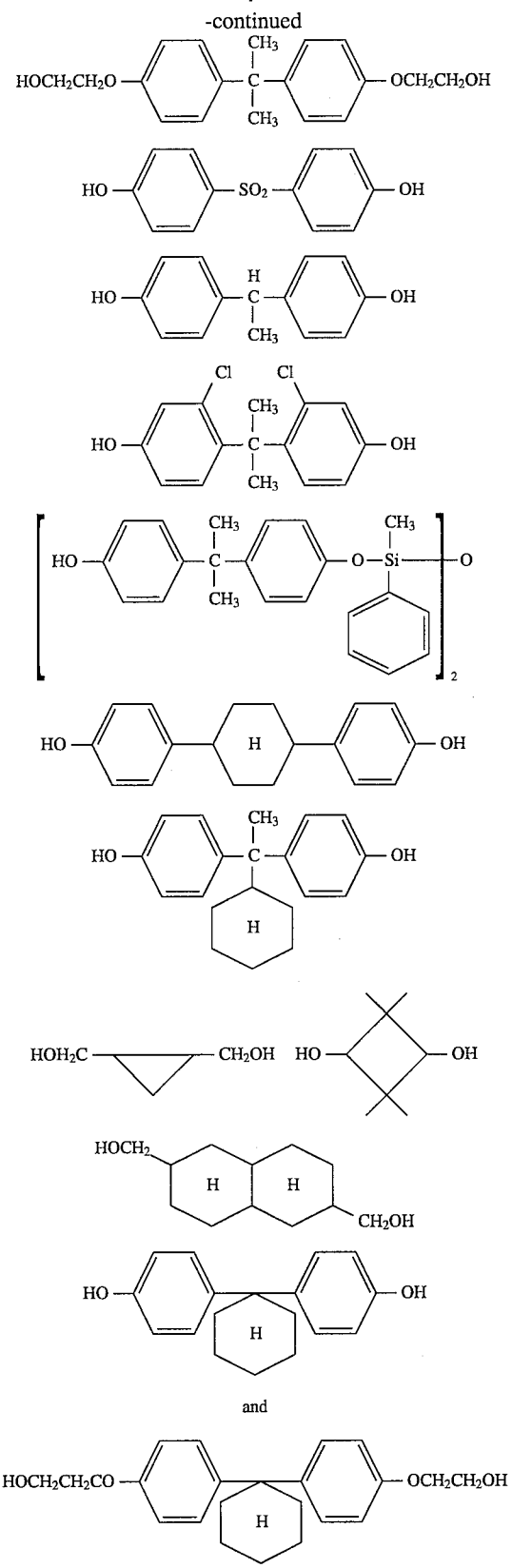

The polyester of the invention employs at least ethylene glycol of the above examples as a glycol ingredient.

In the invention, mono-functional or three or more functional compounds (compounds having hydroxyl groups or having carboxyl groups) may be employed, if desired.

Further, a compound having both a hydroxyl group and a carboxyl group (or its ester group) may be employed. Examples of such compound are as follows;

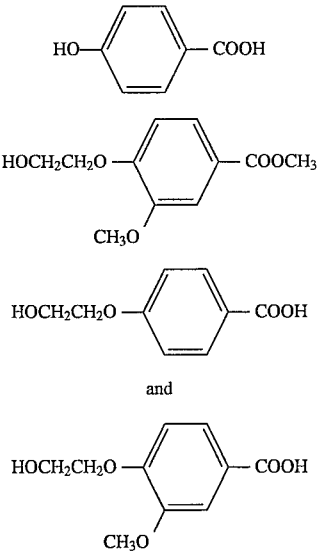

The invention preferably uses as polyester homopolymers such as poly(ethylene terephthalate), poly(ethylene naphthalate) and poly(cyclohexanedimethanol terephthalate), and copolymers derived from these ingredients and the following preferred ingredient.

Preferred examples of dibasic acid include 2,6-naphthalenedicarboxylic acid (NDCA), 1,5-naphthalenedicarboxylic acid, 1,4-naphthalenedicarboxylic acid, 1,6-naphthalenedicarboxylic acid and ethylene glycol, terephthalic acid (TPA), isophthalic acid (IPA), orthophthalic acid (OPA) and paraphenylenedicarboxylic acid (PPDC). Preferred examples of glycol include ethylene glycol (EG), cyclohexanedimethanol (CHDM), neopentyl glycol (NPG), bisphenol A (BPA) and biphenol (BP). Preferred examples of hydroxycarboxyllic acid include parahydroxybenzoic acid (PHBA) and 6-hydroxy-2-naphthalenecarboxylic acid (HNCA).

Preferred examples of polyesters of the invention include a copolymer of naphthalenedicarboxylic acid (NDCA), terephthalic acid (TPA) and ethylene glycol (EG) (the molar ratio of TPA and NDCA preferably is 0.9:0.1 to 0.1:0.9 [TPA:NDCA] and more preferably is 0.8:0.2 to 0.2:0.8); a copolymer of terephthalic acid (TPA), ethylene glycol (EG) and bisphenol A (BPA) (the molar ratio of EG and BPA preferably is 0.6:0.4 to 0:1.0 [EG:BPA] and more preferably is 0.5:0.5 to 0.1:0.9); a copolymer of isphthalic acid (IPA), paraphenylenedicarboxylic acid (PPDC), terephthalic acid (TPA) and ethylene glycol (EG) (the molar propotion of each of IPA and PPDC, when TPA is 1, preferably is 0.1 to 0.5 and 0.1 to 0.5, and more preferably is 0.2 to 0.3 and 0.2 to 0.3); a copolymer of terephthalic acid (TPA), neopentyl glycol (NPG) and ethylene glycol (EG) (the molar ratio of NPG and EG preferably is 1:0 to 0.7:0.3 [NPG:EG], and more preferably is 0.9:0.1 to 0.6:0.4); a copolymer of terephthalic acid (TPA), ethylene glycol (EG) and biphenol (BP) (the molar ratio of EG and BP preferably is 0:1.0 to 0.8:0.2 [EG:BP] and more preferably is 0.1:0.9 to 0.7:0.3); and a copolymer of parahydroxybenzoic acid (PHBA), ethylene glycol (EG) and terephthalic acid (TPA) (the molar ratio of PHBA and EG preferably is 1:0 to 0.1:0.9 [PHBA:EG], and more preferably is 0.9:0.1 to 0.2:0.8).

The polyester employed in the invention is most preferably obtained by polymerization of a dibasic acid selected from 2,6-naphthalenedicarboxylic acid, 1,5-naphthalenedicarboxylic acid, 1,4-naphthalenedicarboxylic acid and 1,6-naphthalenedicarboxylic acid and ethylene glycol, particulary polymerization of 2,6-naphthalenedicarboxylic acid and ethylene glycol. In this case, the the naphthalenedicarboxylic acid is preferably employed in the amount of not less than 10 molar % and more preferably in the amount of not less than 30 molar %, based on the total amount of the dibasic acid.

These homopolymers and copolymers (polyesters) of the invention can be synthesized by a conventional method. For example, the synthesis is conducted by direct esterification of dibasic acid and glycol, by ester interchange of dialkylester of dibasic acid and glycol and removement of excess glycol under heating and reduced pressure, or by reaction of basic halide (instead of dibasic acid) with glycol. In the synthesis, further ester interchange may be carried out, or a catalyst, an initiator and a thermal stabilizer may be added.

The polyester can be prepared in accordance with a known method, for example, described in "Polycondensation and Polyaddition", vol. 5 of Polymer Experimental Study, (KYORITSU SYUPPAN, 1980), pp. 103–136; or "Synthetic Polymer V", (ASAKURA SYOTEN, 1971), pp. 187–286.

An average molecular weight of the polyester employed in the invention preferably is in the range of about 10,000 to about 500,000.

Further, the blend or the radical bridge of the above polymers can be easily performed according to the methods as Japanese Patent Provisional Publications No. 49(1974)-5482, No. 64(1989)-4325 and No. 3(1991)-192781, and Research Disclosures No. 283,739–41, No. 284,779–82 and No. 294,807–14.

The polyester of the invention has a glass transition temperature (Tg) not less than 50° C. However, when the camera using the polyester film is used outdoors in midsummer, the polyester film is exposed to environment at a high temperature of 40° C. Therefore, the Tg of the polyester preferably is not less than 55° C., more preferably is not less than 60° C. and most preferably is not less than 70° C. This is reason why the effect obtained by the heat treatment of the invention, which is carried out to reduce a curling property, is extinguished in environment at a temperature higher than Tg.

The polyester is generally reduced in transparency in the case that its Tg is higher than 200° C. Hence, the polyester of the invention is required to have Tg of 50° to 200° C.

Preferred examples of the polyester according to the invention are as follows:

| P-0 | TPA/EG (PET) | (100/100) | Tg: 80° C. |
| P-1 | NDCA/EG (PEN) | (100/100) | Tg: 119° C. |
| P-2 | TPA/CHDM | (100/100) | Tg: 93° C. |
| P-3 | TPA/BPA | (100/100) | Tg: 192° C. |
| P-4 | NDCA/TPA/EG | (50/50/100) | Tg: 92° C. |
| P-5 | NDCA/TPA/EG | (75/25/100) | Tg: 102° C. |
| P-6 | NDCA/TPA/EG/BPA | (50/50/75/25) | Tg: 112° C. |
| P-7 | TPA/EG/BPA | (100/50/50) | Tg: 105° C. |
| P-8 | TPA/EG/BPA | (100/25/75) | Tg: 135° C. |
| P-9 | TPA/EG/CHDM/BPA | (100/25/25/50) | Tg: 115° C. |
| P-10 | IPA/PPDC/TPA/EG | (20/50/30/100) | Tg: 95° C. |
| P-11 | NDCA/NPG/EG | (100/70/30) | Tg: 105° C. |
| P-12 | TPA/EG/BP | (100/20/80) | Tg: 115° C. |
| P-13 | PHBA/EG/TPA | (200/100/100) | Tg: 125° C. |
| Examples of polymer blends are as follows: | | | |
| P-14 | PEN/PET | (60/40) | Tg: 95° C. |
| P-15 | PEN/PET | (80/20) | Tg: 104° C. |
| P-16 | PAr/PEN | (50/50) | Tg: 142° C. |
| P-17 | PAr/PCT | (50/50) | Tg: 118° C. |
| P-18 | PAr/PET | (60/40) | Tg: 101° C. |
| P-19 | PEN/PET/PAr | (50/25/25) | Tg: 108° C. |
| P-20 | TPA/SIP/EG | (95/5/100) | Tg: 65° C. |

Each of the value within () of P-0 to p-13 and p-20 means a molar ratio of components (compounds) constituting each polyester. Each of the value within () of P-14 to p-19 means a weight ratio of polymers constituting each polyester blend. The abbreviations of the components (dibasic acids or glycols) mean the following compounds.

TPA: terephthalic acid
EG: ethylene glycol
NDCA: 2,6-naphthalenedicarboxylic acid
CHDM: cyclohexanedimethanol
BPA: bisphenol A
PPDC: paraphenylenedicarboxylic acid
IPA: isophthalic acid
NPG: neopentyl glycol
BP: biphenol
PHBA: parahydroxybenzoic acid
PEN: poly(ethylene terenaphthalate)
PET: poly(ethylene terephthalate)
PAr: polyarylate
PCT: poly(cyclohexanedimethanol terephthalate)
SIP: 5-sulfoisophthalic acid In the invention, the polyesters having a glass transition temperature (Tg) of 50° to 200° C. such as examples as mentioned above, are employed for a support. The support of such polyester is stretched in the specific conditions (as described hereinafter) before provision of the subbing layer and then is subjected to the heat treatment (which is described hereinafter) to give a support greatly improved in set-core curling tendency.

The curling tendency-reduction effect obtained by the stretching and the heat treatment (at the temperature of 40° C. to Tg) is lost by exposure to the temperature of higher than Tg. This is because exposing a support film in a glass condition having a small free volume to a temperature of Tg or higher, allows the support film to return once again to a rubber condition having a large free volume due to an active micro Brownian motion. In the support in the rubber condition, a strong curl is easily formed once again. Hence, polyester for the support having a higher Tg is preferable, but there is no polyester having Tg of higher than 200° C. Therefore, the invention employs polyesters having Tg of 50° to 200° C.

The polyester support of the photographic material is usually prepared in the following manner.

A polyester material is first fused. The fused polyester material is fused by heating at a temperature higher than its melting point by at least 10° C. The melted (fused) polyesters each is uniformly mixed or dispersed by means of a melt extruder or a single or double kneader to extrude the polyester in the form of sheet from a ring die or T type die. The film is cooled and hardened by passing through a cooling drum or a cold water cistern. Thereafter the film is optionally subjected to monoaxial stretching in a lengthwise direction, or diaxial stretching simultaneously or successively in a lengthwise direction and in a widthwise direction. The stretching in the both directions is usually carried out in the range of 2 to 3 times, at a temperature in the range of the glass transition point to the melting point of the film.

In the polyester support of the invention, the above diaxial stretching process is performed in the specific conditions in order to improve the curling tendency. The stretching process is usually carried out by regulating the stretch conditions (a stretching temperature, a stretching magnification, and stretching speed).

In the invention, the stretching magnification is generally regulated to 3.05 to 4.0 times in both lengthwise direction and widthwise direction, preferably regulated to 3.05 to 3.8 times, more preferably regulated to 3.05 to 3.7 times and most preferably regulated to 3.1 to 3.6 times. When the stretching magnification is less than 3.2, the resultant polyester film does not show satisfactory flexibility. When the stretching magnification is more than 4.0, the resultant polyester film does not show satisfactory bending strength, i.e., show increased brittleness. Thus, the polyester stretched in the range of the above stretching magnification is enhanced in flexibility without reduction of bending strength.

In the stretching process, the stretching temperature is generally regulated in Tg to (Tg+40° C.), preferably in (Tg+10° C.) to (Tg+40° C.) and more preferably in (Tg+10° C.) to (Tg+30° C.). Further, the stretching speed is preferably regulated at 5%/second to 200%/second.

The polyester support may be subjected to heat relaxation treatment after the stretching. For instance, the polyester film is subjected to the heat relaxation by 20 to 5% at the temperature of 200° to 250° C.

The polyester support enhanced in flexibility without reduction of bending strength can be easily obtained by stretching in the conditions of the stretching magnification of 3.05 to 4.0 times and the temperature of Tg to (Tg+40° C.). In the stretching conditions, the stretching speed is more preferably regulated at 5%/second to 200%/second.

The stretched polyester support generally has a thickness of 50 to 100 μm, preferably 60 to 100 μm, and more preferably 70 to 95 μm. In the case of a thickness of less than 50 μm, such a thin support is not capable of enduring the shrinkage stress of the photosensitive layer during drying. In the case of a thickness of more than 100 μm, such a thick support is against to the object of reducing a thickness of the support to give a compact-sized camera. The above polyester films all have bending strength higher than those of TAC films or polyester films stretched in the conventional conditions. Therefore, if such PET or PEN is employed for material of the support, the thickness of 120 μm which is the minimum thickness required in TAC film can be reduced to 100 μm. However, the reduction of the thickness of the film is not still satisfied.

The stretched polyester support, before or after provision of a subbing layer, is subjected to the heat treatment so that a free volume (strain) is relaxed. In more detail, a subbing layer is provided on the stretched polyester support to form a composite, and further the composite is subjected to the heat treatment at a temperature of 40° C. to Tg for 0.1 to 1,500 hours. Otherwise, the stretched polyester support is subjected to the heat treatment, and a subbing layer is provided on the heat-treated polyester support to form a composite.

As mentioned above, the heat treatment process of the invention is conducted at the temperature from 40° C. to the glass transition temperature (Tg) for 0.1 to 1500 hours. The effect of the heat treatment is more rapidly obtained with increasing heat treatment temperature. However, if the heat treatment temperature is higher than Tg, the molecules randomly move to increase the molecules free volume. As a result, the film molecules become more fluid and the curling tendency of the film increases. Hence, the heat treatment should be carried out at a temperature of not more than Tg. The heat treatment is generally performed in the range from a temperature 50 degree (°C.) lower than Tg to Tg, preferably in the range of (Tg–30° C.) to Tg and more preferably in the range of (Tg–20° C.) to Tg.

The effect of the heat treatment can be obtained when the treatment is performed for 0.1 hour or more. On the other hand, even when the treatment is performed for 1500 hours or more, the effect attains to the saturated condition. Hence, the heat treatment is performed for 0.1 to 1500 hours, generally for 0.5 to 1000 hours, preferably for 0.5 to 500 hours and more preferably for 10 to 100 hours.

In order to reduce the time period for the heat treatment, the film is, before the heat treatment, preferably pre-heated at the temperature higher than the glass transition temperature (Tg) for a short time and is more preferably pre-heated at the temperature between a temperature 20° C. higher than Tg and 100° C. for 5 minutes to 3 hours.

In the heat treatment, the film may be heated in the form of roll (in the state of winding) by allowing the film to stand in a house for heating, but the film is preferably heated in the form of film by transforming the film into a heating zone (or passing through a heat roll) and rolling it immediately.

The core of the roll employed in the heat treatment preferably has a hollow shape, or preferably has a heater therein or a structure in which a liquid for heating can be circulated so as to effectively conduct heat into the roll. Although materials of the core are not particularly restricted, preferred are materials such as stainless and resin containing glass fiber which scarcely show decrease of mechanical strength or deformation by exposing to heat.

The heat treatment process includes a heat treatment of cooling at an average cooling speed of –20° to –0.01° C./minute at the temperature from the glass transition temperature to a temperature 40° C. lower than the glass transition temperature before forming the subbing layer on the support. The temperature is generally once raised to Tg or higher and then gradually cooled down. An average cooling speed at a temperature of Tg to (Tg–40° C.) is in the range of –20° C./minute to –0.01° C./minute. Cooling at the speed higher than the absolute value of –20(°C./minute) is so rapid that the molecule can not be transferred to a stable condition having a small free volume. Therefore, the resultant support (or the resultant film) has a large free volume and shows a high curling tendency. In the case of a cooling speed less than the absolute value of –0.01 (°C./minute), the molecule is perfectly transferred to a stable structure and has no free volume. The heat treatment may be carried out in a dry condition. Otherwise, steam may be used to plasticize a molecule in a support with a water molecule and accelerate the shift of a structure to a stable Further, the support is preferably slowly cooled from a temperature of (Tg+130° C.) to Tg.

Use of a polyester film as a support of a photographic material brings about occurrence of light-piping (i.e., edge fog) due to its high refractive index. Polyesters, particularly aromatic polyesters, have a high reflective index of 1.6 to 1.7, while gelatin, which is the essential component of a light-sensitive layer to be coated over the polyester support, has a lower refractive index of 1.50 to 1.55. Therefore, when light is incident upon the edge of such photographic film, it easily reflects on the interface between the support and the light-sensitive layer. The reflection results in a light-piping phenomenon.

Further, a photographic film-incorporated camera (disposable camera), which shows a structure of the invention, has a simple structure and therefore the photographic is not sufficiently shaded from light.

In order to improve such light-piping and shading from light, dyes and pigments, which dose not noticeably increase the film haze, is preferably added into the polyester. Use of the dyes is more preferred.

The dyes employable in the invention are those represented by the following formulae:

(I):

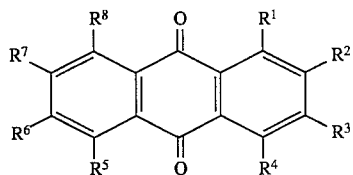

wherein each of $R^1$, $R^2$, $R^3$, $R^4$, $R^5$, $R^6$, $R^7$ and $R^8$ stands for a hydrogen atom, a hydroxyl group, an aliphatic group, an aromatic group, a hetrocyclic group, a halogen atom, a cyano group, a nitro group, —$COR^9$, —$COOR^9$, —$NR^9R^{10}$, —$NR^{10}COR^{11}$, —$NR^{10}SO_2R^{11}$, —$CONR^9R^{10}$, —$SO_2NR^9R^{10}$, —$COR^{11}$, —$SO_2R^{11}$, —$OCOR^{11}$, —$NR^9CONR^{10}R^{11}$, —$CONHSO_2R^{11}$ or —$SO_2NHCOR^{11}$, and $R^1$ and $R^2$ or $R^2$ and $R^3$ may be linked each other to form a 5- or 6-membered ring, in which each of $R^9$ and $R^{10}$ represents a hydrogen atom, an aliphatic group, an aromatic group or a hetrocyclic group, $R^9$ and $R^{10}$ may be linked each other to form a 5- or 6-membered ring, and $R^{11}$ represents an aliphatic group, an aromatic group or a hetrocyclic group;

(II):

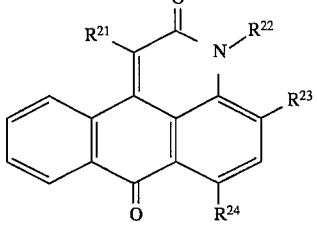

wherein each of $R^{21}$, $R^{23}$ and $R^{24}$ stands for a hydrogen atom, a hydroxyl group, a nitro group, a cyano group, an aliphatic group, an aromatic group, —$COR^{29}$, —$COOR^{29}$, —$NR^{29}R^{30}$, —$NR^{30}COR^{31}$ or —$NR^{30}SO_2R^{31}$, and $R^{22}$ stands for an aliphatic group or an aromatic group, at least one of $R^{21}$, $R^{22}$, $R^{23}$ and $R^{24}$ being a group other than a hydrogen atom, in which each of $R^{29}$ and $R^{30}$ represents the same meaning as defined in $R^9$ and $R^{10}$ of the formula (I) and $R^{31}$ represents the same meaning as defined in $R^{11}$ of the formula (I).

In the formula (I), the aliphatic group represented by $R^1$, $R^2$, $R^3$, $R^4$, $R^5$, $R^6$, $R^7$, $R^8$, $R^9$, $R^{10}$ and $R^{11}$ preferably stands for an alkyl group of 1–20 carbon atoms such as methyl, ethyl, n-butyl, isopropyl, 2-ethylhexyl, n-decyl or n-octadecyl, a cycloalkyl group of 1–20 carbon atoms such as cyclopentyl or cyclohexyl, or an allyl group. The aliphatic group may be substituted by a halogen atom such as F, Cl, Br or I, a hydoxyl group, a cyano group, a nitro group, a carboxy group, an aryl group of 6–10 carbon atoms such as phenyl or naphthyl, an amino group of 0–20 carbon atoms such as —$NH_2$, —$NHCH_3$, —$N(C_2H_5)_2$, —$N(C_4H_9)_2$, —$N(C_8H_{17})_2$, anilino or 4-methoxyanilino), an amido group of 1–20 carbon atoms such as acetylamino, hexanoylamino, bezoylamino or octadecanoylamino, a carbamoyl group of 1–20 carbon atoms such as unsubstituted carbamoyl, methylcarbamoyl, ethylcarbamoyl, octylcarbamoyl or hexadecylcarbamoyl, an ester group of 2–20 carbon atoms such as methoxycarbonyl, ethoxycarbonyl, phenoxycarbonyl, n-butoxycarbonyl or dodecyloxycarbonyl, an alkoxy or aryloxy group of 1–20 carbon atoms such as methoxy, ethoxy, butoxy, isopropoxy, benzyloxy, phenoxy or octadecyloxy, a sulfonamido group of 1–20 carbon atoms such as methansulfonamido, ethansulfonamido, butansulfonamido, benzensulfonamido or octansulfonamido, a sulfamoyl group of 0–20 carbon atoms such as unsubstituted sulfamoyl, methylsulfamoyl, butylsulfamoyl or decylsulfamoyl, or a 5- or 6-membered heterocyclic group such as pyridyl, pyrazolyl, morpholino, piperidino, pyrrolino or benzoxazolyl.

The aromatic group represented by $R^1$, $R^2$, $R^3$, $R^4$, $R^5$, $R^6$, $R^7$, $R^8$, $R^9$, $R^{10}$ and $R^{11}$ preferably stands for an aryl group of 6–20 carbon atoms such as phenyl or naphtyl, which may be substituted by the substituent group set forth in the above aliphatic group or an alkyl group of 1–20 carbon atoms such as methyl, ethyl, butyl, t-butyl or octyl.

The heterocyclic group represented by $R^1$, $R^2$, $R^3$, $R^4$, $R^5$, $R^6$, $R^7$, $R^8$, $R^9$, $R^{10}$ and $R^{11}$ preferably stands for a group of 5- or 6- membered heterocyclic ring such as pyridine, piperidine, morpholine, pyrrolidine, pyrazole, pyrazolidine, pyrazoline, pyrazolone or benzoxazole. The heterocyclic group may have the substituent as described in the above aromatic group.

The 5- or 6-membered ring formed by $R^9$ and $R^{10}$ preferably is piperidine, morpholine or pyrrolidine. The 5- or 6-membered ring formed by $R^1$ and $R^2$ or $R^2$ and $R^3$ preferably is benzen or phthalimide.

In the formula (II), the aliphatic group represented by $R^{21}$, $R^{22}$, $R^{23}$ and $R^{24}$ preferably stands for the same meaning as defined in the aliphatic group of $R^1$ to $R^{11}$ of the formula (I), and the aromatic group represented by $R^{21}$, $R^{22}$, $R^{23}$ and $R^{24}$ preferably stands for the same meaning as defined in the aromatic group of $R^1$ to $R^{11}$ of the formula (I).
Preferred examples of the compounds of the formulae (I) and (II) are described below.
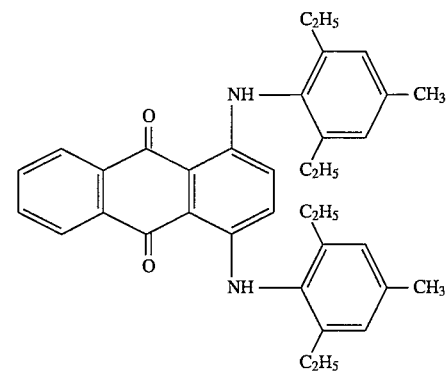
I-1
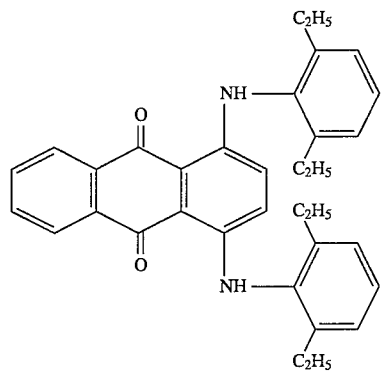
I-2
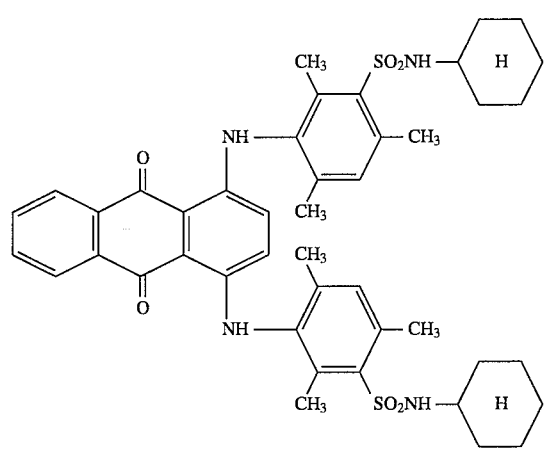
I-3
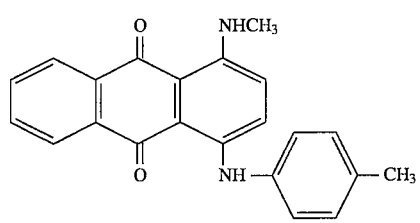
I-4
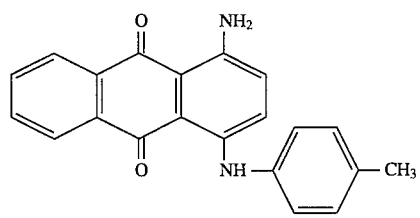
I-5
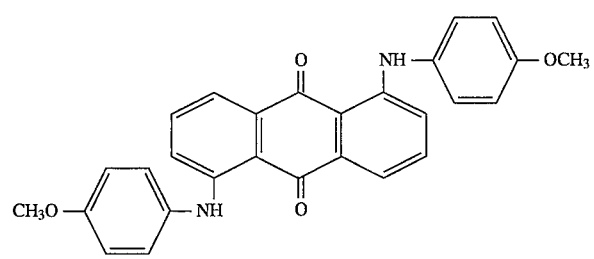
I-6
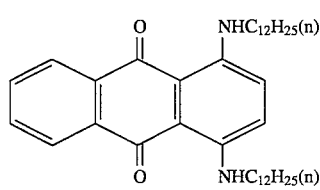
I-7
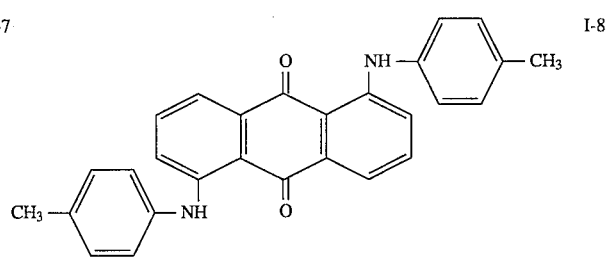
I-8

-continued
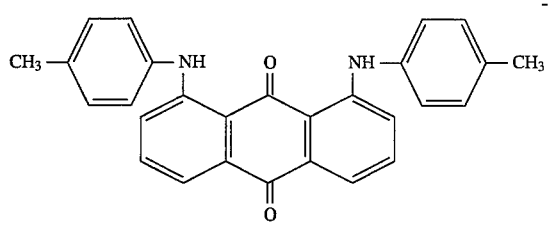
I-9
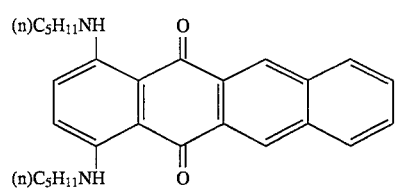
I-10
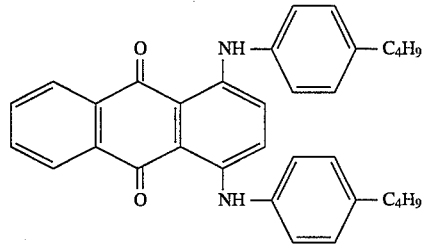
I-11
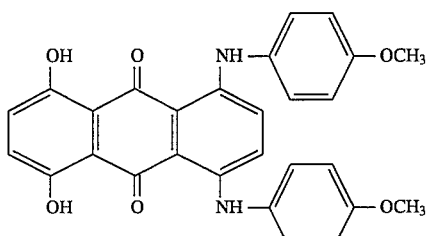
I-12
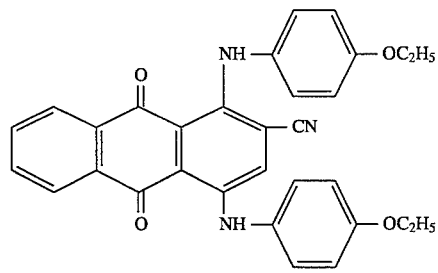
I-13
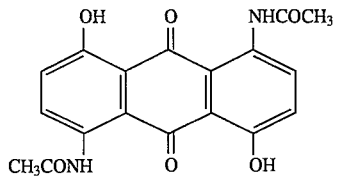
I-14
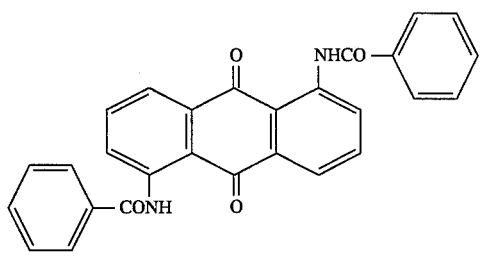
I-15
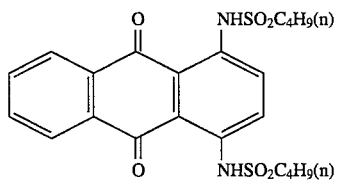
I-16
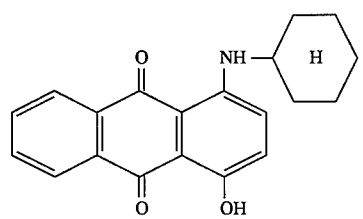
I-17
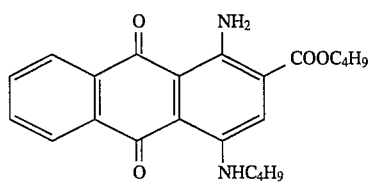
I-18
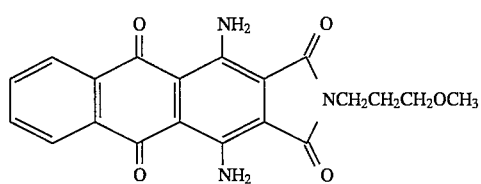
I-19
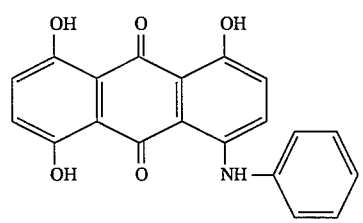
I-20
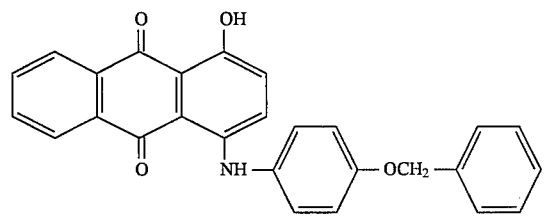
I-21
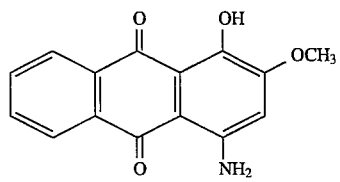
I-22

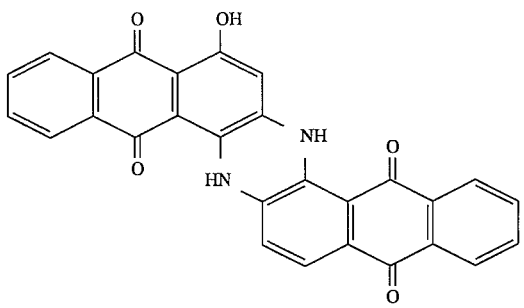

I-23

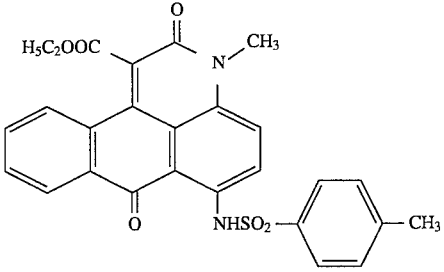

II-1

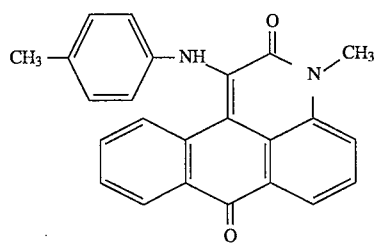

II-2

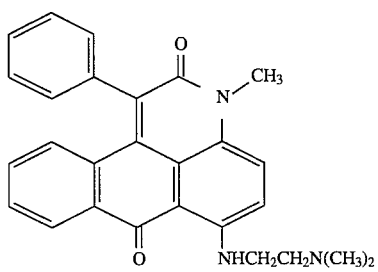

II-3

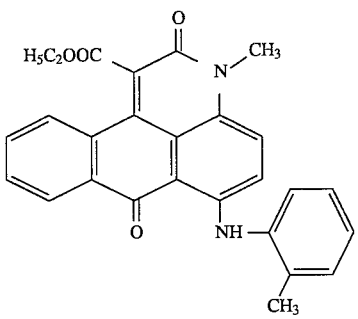

II-4

The compounds of the formulae (I) and (II) can be synthesized by the methods which are described in Japanese Patent Publications No. 45(1970)-15187, No. 51(1976)-25335, No. 51(1976)-33724 and No. 55(1980)-19943; "Journal of Society of Dyers and Colourists" by M. Matsumoto, M. Kishimoto, T. Kitao, Vol. 94, page 435, 1987; and "Chemistry of Dye" by Yutaka Hosoda, pages 673–741, Gihodo, 1957.

The dye may be employed singly or in combination. In practice, it is preferred that two or more dyes are employed to have a color of neutral gray. The dye is generally added to the polyester in the amount of 0.001 to 1.0 g/m² and preferably in the amount of 0.005 to 0.5 g/m². Further, the dye is preferably added to the polyester in the increasing amount of a transmission density of 0.005 to 0.2 and particularly preferably in the increasing amount of a transmission density of 0.01 to 0.1.

Examples of the pigments employable in the invention include a carbon black, an oxide, a sulfate, a sulfite, a carbonate, a halide and a nitrate of an alkali metal, an alkali earth metal, Si, Al, Ti or Fe. Preferred examples are carbon black and titanium dioxide. The pigment is preferably added to the polyester in the increasing amount of a transmission density of 0.005 to 0.2 and particularly preferably in the increasing amount of a transmission density of 0.01 to 0.1.

The polyester of the invention may contain various additives to enhance the characteristics required for a photographic support.

The polyester film may contain an ultraviolet absorbent for the purpose of anti-fluorescence and of stabilization in storage, by kneading the absorbent into the film. As the ultraviolet absorbent, preferred are those having no absorption in the visible region. The amount of the absorbent generally is in the range of 0.01 to 20 weight %, and preferably is in the range of 0.05 to 10 weight %, based on the weight of the polyester. Examples of the ultraviolet absorbent include benzophenone compounds such as 2,4-dihydroxybenzophenone, 2-hydroxy-4-methoxybenzophenone, 2-hydroxy-4-n-octoxybenzophenone, 4-dodecyloxy-2-hydroxybenzophenone, 2,2',4,4'-tetrahydroxybenzophenone and 2,2'-dihydroxy-4,4'-dimethoxybenzophenone; benzotriazole compounds such as 2-(2'-hydroxy-5-methylphenyl)benzotriazole, 2-(2'-hydroxy-3',5'-di-t-butylphenyl)benzotriazole and 2-(2'-hydroxy-3'-di-t-butyl-5'-methylphenyl)benzotriazole; and salicylic acid compounds such as phenyl salicylate and methyl salicylate.

The polyester film may be treated to be lubricative. The methods for making the film lubricative, for instance, include a method of kneading an inactive inorganic compound into the film or a method of coating a surfactant over the film.

Examples of the inactive inorganic compound include $SiO_2$, $TiO_2$, $BASO_4$, $CaCO_3$, talc and kaolin. In addition to the above method of adding the inactive grains to the polyester for making the polyester film lubricant, also employable is another method of precipitating the catalyst, which is to be added to the polymerization reaction system of producing polyester, in the resultant polyester film so as to make the film lubricative due to precipitation of the internal grains.

The support of the photographic material must be transparent as its important requirement, and therefore as means for making the polyester film lubricative, it is preferred to adopt the former method in the case of adding $SiO_2$ grains, which have a reflective index near to that of the polyester, to the polyester, or the latter method that enables the size of the grains precipitated in the polyester film to reduce.

In the case that the polyester film is made lubricative by kneading the grains, it is preferred to further laminate a functional layer on the film to more enhance the transparency of the film. Examples of the laminating methods include co-extrusion with plural extruders and feed blocks, and co-extrusion with multi-manifold dies.

The polyester film has a hydrophobic surface, and therefore it is difficult to firmly bond a photographic layer (e.g., a light-sensitive silver halide emulsion layer, an intermediate layer and a filter layer) or a subbing layer comprising a protective colloid mainly containing gelatin on the support.

Two processes are available as a conventional technique which has been tried to overcome the above difficulty:

(1) a process in which after providing a surface activation treatment such as a chemical treatment, a mechanical treatment, a corona discharge treatment, a flame treatment, a UV treatment, a high frequency wave treatment, a glow discharge treatment, an active plasma treatment, and an ozone oxidation treatment, a subbing layer is formed directly on the above-treated support by coating to obtain a high bonding strength and then a light-sensitive layer is formed on the subbing layer to obtain a high bonding strength; and (2) a process in which a subbing layer is provided without the surface treatment by coating, and then a light-sensitive layer is formed thereon.

These processes are described in U.S. Pat. Nos. 2,698, 241, 2,764,520, 2,864,755, 3,462,335, 3,475,193, 3,143,421, 3,501,301, 3,460,994 and 3,674,531, British Patents No. 788,365, No. 804,005 and No. 891,469, and Japanese Patent Publications No. 48(1973)-43122 and No. 51(1976)-446.

It is assumed that any of these surface treatments is effected by forming some polar groups on a surface of a support which is originally hydrophobic and by increasing a cross linking density on a surface, and as a result, it is considered that the affinity of the components contained in a subbing layer with the polar group is increased or the bonding strength between the subbing layer and the support is enhanced. Further, various devices are given to the constitution of the subbing layer. There are a multi-layer process in which a layer bonding strongly to a support (hereinafter referred to as the first subbing layer) is provided as the first layer and a hydrophilic resin layer bonding strongly to a photographic layer is provided thereon as the second layer, and a single layer process in which only a resin layer containing both a hydrophobic group and a hydrophilic group is coated over a support.

Of the surface treatments described in above (1), the corona discharge treatment is the most known process. The treatment can be performed by the processes described in Japanese Patent Publications No. 48(1973)-5043, No. 47(1972)-51905, No. 47(1972)-28067, No. 49(1974)-83767, No. 51(1976)-41770 and No. 51(1976)-131576. A discharge frequency is generally 50 Hz to 5,000 kHz and preferably 5 to 100 kHz. The discharge frequency lower than 50 Hz does not bring about a stable discharge unfavorably generate a pin hole on a material to be treated. In contrast, the frequency higher than 5,000 kHz requires a specific equipment for matching impedance and unfavorably increases the cost of the machine. The treatment strength preferably is 0.001 to 5 kV·A·minute/m$^2$, more preferably 0.01 to 1 kV·A·minute/m$^2$ for the improvement in a wetting property of a plastic film such as polyester or polyolefin. A gap clearance between an electrode and a dielectric roll generally is in the range of 0.5 to 2.5 mm, and preferably in the range of 1.0 to 2.0 mm.

Further, the glow discharge treatment is the surface treatment which is most effective in many case. The process is described in Japanese Patent Publications No. 35(1960)-7578, No. 36(1961)-10336, No. 45(1970)-22004, No. 45(1970)-22005, No. 45(1970)-224040 and No. 46(1971)-43480, U.S. Pat. Nos. 3,057,792, 3,057,795, 3,179,482, 3,288,638, 3,309,299, 3,424,735, 3,462,335, 3,475,307 and 3,761,299, British Patents No. 997,093 and Japanese Patent Provisional Publication No. 53(1978)-129262.

With respect to the glow discharge treatment conditions, pressure generally is in the range of 0.005 to 20 Torr, and more preferably in the range of 0.02 to 2 Torr. The pressure lower than 0.02 reduces an effect of the surface treatment and the pressure higher than 20 Torr allows an excessive current to flow and therefore a spark is apt to produce. Discharge is generated by loading a high voltage between one or more pair of metal plates or metal rods arranged at the interval in a vacuum tank. This voltage has various depending on variation of a composition and pressure of an environmental gas. A stable and steady glow discharge usually takes place between 500 to 5,000 V in the above pressure range. The range of the voltage particularly suitable for improving a bonding strength is 2,000 to 4,000 V.

A discharge frequency preferably is in the range of 0 (i.e., a direct current) to several thousand MHz and more preferably in the range of 50 Hz to 20 MHz. The strength of a discharge treatment preferably is in the range of 0.01 to 5 kV·A·minute/m$^2$ and more preferably in the range of 0.15 to 1 kV·A·minute/m$^2$ because of obtaining a desired bonding strength.

Subsequently, the surface treatment described in (2) above is described. Examples of known materials for the first subbing layer in the multi-layer process include polyethyleneimine, an epoxy resin, a grafted gelatin and nitrocellulose as well as polymers derived from vinyl chloride, vinylidene chloride, butadiene, methacrylic acid, acrylic acid, itaconic acid and maleic anhydride. An example of a known material for the second subbing layer include gelatin.

In the single layer process, a support is swollen and is subjected to an internal mixing with a hydrophilic polymer for the subbing layer to obtain a high bonding strength in many cases. Examples of materials for the subbing layer include a water soluble polymer, cellulose ester, a latex polymer and a water soluble polyester. Examples of materials for the water soluble polymer include gelatin, gelatin derivatives, casein, agar, sodium alginate, starch, polyvinyl alcohol, an acrylic acid-containing copolymer and a maleic anhydride-containing copolymer. Examples of materials for the cellulose ester include carboxymethyl cellulose and hydroxyethyl cellulose. Examples of materials for the latex polymer include a vinyl chloride-containing copolymer, a vinylidene chloride-containing copolymer, an acrylic acid ester-containing copolymer, a vinyl acetate-containing copolymer and a butadiene-containing copolymer. Gelatin particularly is preferred.

Examples of the compounds which swell the support include resorcin, chlororesorcin, methylresorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid and chloral hydrate. Preferred are resorcin and p-chlorophenol.

Various gelatin hardeners can be employed for the subbing layer.

Examples of the gelatin hardeners include a chromium salt (e.g., chrome alum), aldehydes (e.g., formaldehyde and glutaraldehyde), isocyanates, an active halogen compound (e.g., 2,4-dichloro-6-hydroxy-s-triazine), and an epichlorohydrin resin.

The subbing layer may contain, as a matting agent, an inorganic fine particle such as $SiO_2$ or $TiO_2$ or a fine particle of polymethyl methacrylate copolymer (diameter: 1–10 μm).

Further, a coating solution for forming the subbing layer may contain various additives other than the above compounds. For instance, examples of the additives include a surface active agent, an antistatic agent, an antihalation agent, a coloring dye, a pigment, a coating aid and an antifogging agent.

The coating solution for the subbing layer can be coated by known coating methods such as a dip coating method, a roller coating method, a curtain coating method, an air knife coating method, a wire bar coating method, a gravure coating method or an extrusion coating method using a hopper described in U.S. Pat. No. 2,681,294. Two or more layers can be simultaneously be coated according to the processes described in U.S. Pat. Nos. 2,761,791, 3,508,947, 2,941,898 and 3,526,528, and "Coating Technology" written by Y. Harasaki, page 253 (published by Asakura Book, 1973), if desired.

The backing layer can employ, as a binder, a hydrophobic polymer or a hydrophilic polymer as used for the subbing layer.

The backing layer may contain an antistatic agent, a sliding agent, a matting agent, a surface active agent and a dye. Examples of the antistatic agent include anionic polymer electrolytes such as polymers containing carboxylic acid, carboxylic acid salt and sulfonic acid salt described in Japanese Patent Provisional Publications No. 48(1973)-22017, No. 51(1976)-30725, No. 51(1976)-129216 and No. 55(1980)-95942, and Japanese Patent Publication No. 46(1971)-24159; and cationic polymers described in Japanese Patent Provisional Publications No. 49(1974)-121523 and No. 48(1973)-91165, and Japanese Patent Publication No. 49(1974)-24582. Examples of the surface active agent include anionic or cationic surface active agents described in U.S. Pat. Nos. 2,992,108 and 3,206,312, Japanese Patent Provisional Publications No. 49(1974)-85826, No. 49(1974)-33630, No. 48(1973)-87862 and No. 55(1980)-70837, and Japanese Patent Publications No. 49(1974)-11567 and No. 49(1974)-11536.

The antistatic agent of the backing layer preferably is the fine particle of at least one crystalline metal oxide selected from $ZnO$, $TiO_2$, $SnO_2$, $Al_2O_3$, $In_2O_2$, $SiO_2$, $MgO$, $BaO$, $MoO_3$ and $V_2O$, or a composite metal oxide thereof. The volume resistivity of the crystalline metal oxide or composite metal oxide thereof preferably is not more than $10^7$ Ω cm, and more preferably not more than $10^5$ Ω cm. The particle size of the oxide preferably is 0.002 to 0.7 μm, and more preferably 0.005 to 0.3 μm. Use of the fine particle is preferred from the viewpoint of prevention of occurrence of static mark.

In the photographic film-incorporated camera of the invention, the diameter of a spool or a vacant core (in the supply room) around which the photographic film is wounded preferably is in the range of 3 to 13.5 mm. The film having the diameter less than 3 mm reduces the photographic characteristics of a light-sensitive layer and other layers due to pressure caused by bending stress of the film. Further, the diameter of a spool or a vacant core preferably is in the range of 3 to 12 mm, more preferably in the range of 3 to 10 mm and most preferably in the range of 4 to 9 mm.

As for the diameter of the spool of the cartridge (in the wind-up room) around which the photographic film is wounded, i.e., the diameter of a core that the film itself is wound up to form, the diameter generally is in the range of 3 to 15 mm. Further, the diameter of photographic film preferably is in the range of 5 to 15 mm, more preferably is in the range of 6 to 13.5 mm, particularly preferably in the range of 7 to 13.5 mm, and most preferably in the range of 7 to 13 mm.

The silver halide photographic material employable in the invention is described below.

The silver halide emulsion layer may be used for either a black and white photographic material or a color photographic material. The silver halide photographic material (silver halide emulsion layer) for color photographic material is described below.

The color photographic material may have at least one of layers consisting of a red-sensitive emulsion layer, a green-sensitive emulsion layer and a blue-sensitive emulsion layer on the support. The arrangement of those layers can be optionally determined. As a typical example, there can be mentioned silver halide photographic material provided with at least one sensitive layer consisting of plural silver halide emulsion layers (which are substantially same each other in sensitivity), and the sensitive layer is a red-sensitive layer, a green sensitive layer or a blue sensitive layer. In a multi-layered silver halide color photographic material, generally, the red-sensitive layer, the green sensitive layer and the blue sensitive layer are arranged from the support side in this order. The blue-sensitive layer, the green-sensitive layer and the red-sensitive layer may be arranged in this order from the support side. Further, the blue-sensitive layer, the red-sensitive layer and the green-sensitive layer may be arranged in this order from the support side. Further, two or more emulsion layers which are sensitive to the same color but show different sensitivities can be provided to enhance the sensitivity. Three emulsion layers can be provided to improve the graininess of the image. A non-light sensitive layer such as an intermediate layer may be interposed between two or more emulsion layers having the same color sensitivity.

The intermediate layer may contain couplers or DIR described in Japanese Patent Publications No. 61(1986)-43741, No. 59(1984)-113438, No. 59(1984)-113440, No. 61(1986)-20037 and No. 61(1986)-20038, The plural silver halide emulsion layers constituting each unit light sensitive layer are described in West Germany Patent No. 1,121,470, in U.K. Patent No. 923,045, in Japanese Patent Publications No. 57(1982)-112751, No. 62(1987)-200350, No. 62(1987)-206541, No. 62(1987)-206543, No. 56(1981)-25738, No. 62(1987)-63936, No. 59(1984)-202464, in Japanese Patent No. 55(1980)-34932, and No. 49(1974)-15495.

Silver halide grains may be regular grains having a regular crystal shape such as a cube, octahedron or tetradecahedron, those having an irregular shape such as sphere or tablet, those having a crystal defect such as twinning plane, or those having a combination of the shapes.

The silver halide grains may be either fine grains of not more than about 0.2 μm in the diameter or giant grains having a projected area diameter or up to about 20 μm. The emulsion may be either a monodisperese emulsion or a polydisperese emulsion.

A photographic emulsion can be prepared in accordance with a method described in Research Disclosure No. 17643 (December 1978), pp. 22–23, "I. Emulsion Preparation and Types", and ibid. No. 18716 (November 1979), page 648, "Chimie et Physique Photographique" by P. Glafkides, Paul Montel, 1967; "Photographic Emulsion Chemistry" by G. F. Duffin, Focal Press, 1966; or "Making and Coating Photographic Emulsion" by V. L. Zelikman et al., Focal Press, 1964).

Further, monodisperse emulsions as described in U.S. Pat. Nos. 3,574,628 and 3,655,394, and U.K. Patent 1,413,748 is also preferred.

A tabular silver halide grain having an aspect ratio of not less than 5 can also be employed in the invention. A tabular silver halide grain can be easily prepared in accordance with methods described in "Photographic Science and Engineering" by Gutoff, vol. 14 (1970), pp. 248–257; U.S. Pat. Nos. 4,434,226, 4,414,310, 4,433,048, 4,439,520 and U.K. Patent No. 2,112,157.

The crystal structure may be either homogeneous or heterogeneous. In the heterogeneous structure, the halogen compositions positioned inside and outside are different each other. The crystalline may be of a layered structure. Some silver halides in which halogens are different each other may connect by epitaxial bond to form the crystal, or a salt other than silver halide such as silver rhodanite and lead oxide also may connect to the silver halide crystal by epitaxial bond. Mixture of grains having various crystal shapes also may be employed.

The emulsion used in the invention is usually subject to physical ripening, chemical ripening and spectral sensitization. Additives used in these process are described in Research Disclosure No. 17643 (December, 1978) and ibid., No. 18716 (November, 1979). The pages in which the additives are described are set forth below.

Known photographic additives used in the invention are also described in the above two Research Disclosures. The pages are also set forth below.

| Additives | R.D. No. 17643 | R.D. No. 18716 |
|---|---|---|
| 1. Chemical Sensitizer | pp. 23 | pp. 648, right column |
| 2. Sensitivity Promoter | | same as above |
| 3. Spectral Sensitizer, Supersensitizer | pp. 23–24 | pp. 648, right column - 649, left column |
| 4. Brightening Agent | pp. 24 | |
| 5. Antifogging Agent and Stabilizer | pp. 24–25 | pp. 649, right column |
| 6. Light Absorber, Filter Dye, and U.V. Absorber | pp. 25–26 | pp. 649, right column - 650, left column |
| 7. Color Stain Inhibitor | pp. 25, right | pp. 650, left column - right column |
| 8. Dye Image Stabilizer | pp. 25 | |
| 9. Hardening Agent | pp. 26 | pp. 651, left column |
| 10. Binder | pp. 26 | same as above |
| 11. Plasticizer, Lubricant | pp. 27 | pp. 650, right column |
| 12. Coating Aid, and Surface Active Agent | pp. 26–27 | same as above |
| 13. Antistatic Agent | pp. 27 | same as above |

To inhibit deterioration in photographic properties caused by formaldehyde gas, a compound capable of reacting with and solidifying formaldehyde as disclosed in U.S. Pat. Nos. 4,411,987 and 4,435,503 can be preferably incorporated into the light sensitive material.

Various color couplers can be used for the invention. Concrete examples of the couplers are described in the patents cited in *Research Disclosure* No. 17643, VII C-G.

As a yellow coupler, preferred are those described in, for example, U.S. Pat. Nos. 3,933,501, 3,973,968, 4,022,620, 4,326,024, 4,401,752, 4,248,961, 4,314,023 and 4,511,649, Japanese Patent Publication No. 58(1983)-10739, U.K. Patents No. 1,425,020 and No. 1,476,760, and European Patent No. 249,473A.

As magenta couplers, 5-pyrazolone type and pyrazoloazole type compounds are preferred, and particularly preferred are those described in U.S. Pat. Nos. 4,310,619 and 4,351,897, European Patent No. 73,636, U.S. Pat. Nos. 3,061,432 and 3,725,067, *Research Disclosure* No. 24220 (June, 1984), Japanese Patent Provisional Publication No. 60(1985)-33552, *Research Disclosure* No. 24230 (June, 1984), Japanese Patent Provisional Publications No. 60(1985)-43659, No. 61(1986)-72238, No. 60(1985)-35730, No. 55(1980)-118043 and No. 60(1985)-185951, U.S. Pat. Nos. 4,500,630, 4,540,654 and 4,556,630, and WO(PCT)88/04795.

As cyan couplers, there can be mentioned phenol type and naphthol type couplers, and preferred examples are those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,173, West German Patent Publication No. 3,329,729, European Patents No. 121,365A and No. 249,453A, and U.S. Pat. Nos. 3,446,622, 4,333,999, 4,753,871, 4,451,559, 4,427,767, 4,690,889, 4,254,212 and 4,296,199, and Japanese Patent Provisional Publication No. 61(1986)-42658.

A colored coupler may be used to compensate incidental absorption of a formed dye. The colored coupler is described in *Research Disclosure* No. 17643, VII-G, U.S. Pat. No. 4,163,670, Japanese Patent Publication No. 57(1982)-39413, U.S. Pat. Nos. 4,004,929 and 4,138,258, and U.K. Patent No. 1,146,368.

As couplers which give a color developing dye exhibiting a proper diffusion, preferred are those described in U.S. Pat. No. 4,366,237. U.K. Patent No. 2,125,570, European Patent No. 96,570, and West German Patent Publication No. 3,234,533.

Typical examples of polymerized dye-forming couplers are described in U.S. Pat. Nos. 3,451,820, 4,080,211, 4,367,282, 4,409,320 and 4,576,910, and U.K. Patent No. 2,102,173.

A coupler which releases a photographically useful residue in accordance with a coupling reaction can be also used in the invention. A DIR coupler which releases a development inhibitor is employable. The DIR coupler is described in *Research Disclosure* No. 17643, VII-F, Japanese Patent Provisional Publications No. 57(1982)-151944, No. 57(1982)-154234, No. 60(1985)-184248 and No. 63(1988)-37346, and U.S. Pat. No. 4,248,962.

A coupler which imagewise releases a nucleating agent or a development accelerator in a development process is also available. This coupler is described in U.K. Patents No. 2,097,140 and No. 2,131,188, and Japanese Patent Provisional Publications No. 59(1984)-157638 and No. 59(1984)-170840.

Examples of other couplers employable for the photographic material of the invention include a competing coupler, a polyvalent coupler, a DIR redox compound-releasing coupler, a DIR coupler-releasing coupler, a DIR coupler-releasing redox compound, a DIR redox-releasing redox compound, a coupler which releases a dye having restoration to original color after an elimination reaction, a bleach accelerator-releasing coupler and a coupler which releases ligand. The competing coupler is described in U.S. Pat. No. 4,130,427. The polyvalent coupler is described in U.S. Pat. Nos. 4,283,472, 4,338,393 and 4,310,618. The DIR redox compound-releasing coupler, the DIR coupler-releasing coupler, the DIR coupler-releasing redox compound and the DIR redox-releasing redox compound are described in Japanese Patent Provisional Publications No. 60(1985)-185950 and No. 62(1987)-24252. The coupler which releases a dye having restoration to original color after elimination is described in European Patent No. 173,302A. The bleach accelerator-releasing coupler is described in *Research Disclosure* No. 11449, ibid. No. 24241, and Japanese Patent Provisional Publication No. 61(1986)-201247. The coupler which releases a ligand is described in U.S. Pat. No. 4,553, 477. The coupler which releases leuco-pigment is described in Japanese Patent Provisional Publication No. 63(1988)-75747.

The couplers can be introduced into the photographic material by various known dispersing methods.

Examples of a high-boiling solvent used in an O/W dispersing method are described in U.S. Pat. No. 2,322,027.

Examples of the high-boiling organic solvent having a boiling point of not lower than 175° C. under a normal pressure used in the O/W dispersing method include phthalates (e.g., dibutyl phthalate, dicyclohexyl phthalate, di-2-ethylhexyl phthalate, decyl phthalate, bis(2,4-di-t-amylphenyl)phthalate, bis(2,4-di-t-amylphenyl)isophthalate, bis(1,1-diethylpropyl)phthalate); esters of phosphoric acid or phosphoric acid (e.g., triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, di-2-ethylhexylphenyl phosphate); benzoates (e.g., 2-ethylhexyl benzoate, dodecyl benzoate, 2-ethylhexyl-p-hydroxybenzoate); amides (e.g., N,N-diethyldodecanamide, N,N-diethyllaurylamide, N-tetradecylpyrrolidone); alcohols or phenols (e.g., isostearyl alcohol, 2,4-di-tert-amylphenol); aliphatic carboxylic esters (e.g., bis(2-ethylhexyl)sebacate, dioctyl azelate, glycerol tributylate, isostearyl lactate, trioctyl citrate); aniline derivatives (e.g., N,N-dibutyl-2-butoxyl-5-tert-octylaniline); and hydrocarbons (e.g., paraffin, dodecyl benzene, diisopropyl naphthalene). An organic solvent having a boiling point of not lower than about 30° C. preferably in the range of 50° C. to about 160° C. can be used as an auxiliary solvent. Examples of the auxiliary solvent include ethyl acetate, butyl acetate, ethyl propionate, methyl ethyl ketone, cyclohexanone, 2-ethoxyethyl acetate and dimethylformamide.

A process of a latex dispersing method, effects thereof and concrete examples of latex for impregnation are described in U.S. Pat. No. 4,199,363, West German Patent Applications (OLS) No. 2,541,274 and No. 2,541,230.

In the photographic material, the total thickness of all hydrophilic colloid layers on the emulsion side is preferably not more than 28 μm. The film swelling rate ($T_{1/2}$) is preferably not more than 30 seconds. The film thickness is determined after being stored at a temperature of 25° C. and a relative humidity of 55% for two days. The film swelling rate ($T_{1/2}$) can be determined by a known method in the art, for example, by using a swellometer of the type as described in A. Green et al, "Photographic Science and Engineering", Vol. 19, No. 2. pp. 124–129. $T_{1/2}$ is defined as the time taken until half the saturated film thickness is 90% of the maximum swollen film thickness reached when the photographic material is processed with a color developer at a temperature of 30° C. over 195 seconds.

The film swelling rate ($T_{1/2}$) can be adjusted by adding a film hardner to gelatine as a binder or altering the ageing condition after coating. The percentage swelling of the photographic material is preferably in the range of 150 to 400%. The percentage swelling can be calculated from the maximum swollen film thickness determined as described above in accordance with the following equation:

$$\frac{(\text{maximum swollen film thickness} - \text{film thickness})}{\text{film thickness}}$$

In the color photographic materials according to the present invention, its development processing can be carried out according to conventional methods as described in RD (mentioned above) No. 17643, pp. 28–29, and RD No. 18716, P. 615, left and right columns.

For the purpose of simplifying and speeding up the processing, the silver halide color photographic material may contain a color developing agent, preferably in the form of its precursor. Examples of the precursors include indoaniline compounds described in U.S. Pat. No. 3,342,597, and Schiff base compounds described in U.S. Pat. No. 3,342,599, RD No. 14850 and RD No. 15159.

The present invention is further described by the following examples.

First examples of the silver halide photographic material having a magnetic recording film are described.

EXAMPLE 1

The measuring methods used in the example are explained below.

(1) Core-set curl

The core-set curl means the curling tendency in a lengthwise direction formed by a core set (i.e., to form a curling tendency by rolling a film on a spool). The degree of the curling tendency is measured according to Test Method A of ANSI/ASC PH1.29-1985 and expressed in terms of 1/R [m] (R is a radius of the curl).

(2) Glass transition temperature (Tg)

Using a differential scanning colorimeter (DSC), 10 mg of a sample is heated in a nitrogen stream at a rate of 20° C./minute, a mathematical average temperature of the temperature at which the heated film begins to be shifted from its base line and the temperature at which it comes to return back to a new base line is obtained.

1) Preparation of the support:

The following supports (a)–(d) were prepared according to the processes described below:

(a) PEN support:

To 100 Weight parts of a commercially available poly-(ethylene-2,6-naphthalate) were added 2 weight parts of UV absorber (Tinuvin P.326 available from Ciba-Geigy Co., Ltd.) to be mixed and the mixture was dried according to a conventional method. The mixture was melted at 300° C. and then extruded from a T type die to prepare a film. The film was stretched up to 3.3 times in a lengthwise direction at 140° C., and stretched up to 3.3 times in a widthwise direction at 130° C., and then was placed at 250° C. for 5 seconds (heat fixation), whereby the film having the thickness of 75 μm was obtained.

(b) PET support:

A commercially available poly(ethylene terephthalate) was melted at 270° C. and then extruded from a T type die to prepare a film. The film was stretched up to 3.3 times in a lengthwise direction at 100° C., and stretched up to 3.3 times in a widthwise direction at 110° C., and then was placed at 220° C. for 5 seconds (heat fixation), whereby the film having the thickness of 90 μm was obtained.

(c) TAC support:

Tricaetyl cellulose was dissolved in methylene chloride/methanol (92/8, weight ratio) in the TAC concentration of 13% by weight using a plasticizer TPP/BDP (2/1, TPP: triphenyl phosphate, BDP: biphenyl diphenyl phosphate) of 15 weight %, and the solution was processed by a band-casting process of a conventional solution flowing method.

(d) PEN/PET (4/1, weight ratio) support:

Pellets of PEN and PET were dried in vacuo at 150° C., respectively. They were extruded using a twin-kneading extruder at 280° C. to prepare a pellet.

Using the pellet, a PEN/PET film was produced in the same manner as the process of PEN described above (a).

2) Provision of subbing layer:

The both surfaces of each of the supports were subjected to corona discharge treatment and a subbing layer was then coated on one surface side of the support which has a higher temperature during the stretching procedure. As a corona-discharging treatment, Solid State Corona Processor 6 KVA Model (manufactured be Piller Co.). A 30 cm-wide support sample was processed by the Processor at a speed of 20 m/minute. Based on the current and the voltage values as read out from the processor during the treatment, the sample was subjected to the treatment of 0.375 kV.A.min./m$^2$. The discharging frequency for the treatment was 9.6 KHz, and the gap clearance between the electrode and the dielectric roll was 1.6 mm.

| Subbing Layer Composition: | |
|---|---|
| Gelatin | 3 g |
| Distilled water | 250 cc |
| Sodium di(2-ethylhexyl)sulfosuccinate | 0.05 g |
| Formaldehyde | 0.02 g |

However, on the support (c) was formed a subbing layer having the following composition:

| Subbing Layer Composition: | |
|---|---|
| Gelatin | 0.2 g |
| Salicylic acid | 0.1 g |
| Methanol | 15 cc |
| Aceton | 85 cc |
| Formaldehyde | 0.01 g |

3) Provision of back layer:

The back layer of the following composition was coated on the sides opposite to the sides of the supports.

3-1) Preparation of a conductive fine particle dispersion (tin oxide-anitimony oxide composite dispersing solution):

230 parts by weight of stannic chloride and 23 parts by weight of antimony trichloride were dissolved in 3,000 parts by weight of ethanol to obtain a homogeneous solution. 1N sodium hydroxide aqueous solution was dropped the solution until pH of the above solution becomes 3 to obtain the coprecipitate of colloidal stannic oxide and antimony oxide. The coprecipitate was left standing at 50° C. for 24 hours to obtain a red brown colloidal precipitate.

The red brown colloidal precipitate was separated by centrifugation. Water was added to the precipitate to wash it by centrifugation in order to remove excessive ions. This operation was repeated three times to remove the excessive ions.

200 parts by weight of the colloidal precipitate from which the excessive ions were removed was dispersed once again into 1,500 parts by weight of water, and the dispersion was sprayed into a kiln heated to 600° C., whereby the bluish fine particle powder of the tin-oxide-antimony oxide having the average particle size of 0.1 μm was cm obtained. The volume resistivity of the particle was 25 Ωcm.

After the mixed solution of 40 parts by weight of the above fine particle powder and 60 parts by weight of water was adjusted to pH 7.0 and roughly dispersed with a stirrer, it was dispersed with a horizontal type sand mill (Daino mill manufactured by WILLYA BACHOFENAG) until the staying time became 30 minutes to prepare the prescribed dispersing solution.

3-2) Preparation and provision of backing layer:

The following composition [A] was coated on the support so as to have a dry layer thickness of 0.3 μm and dried at 115° C. for 60 seconds. The following coating solution for covering [B] was further coated thereon to have a dry layer thickness of 0.1 μm and dried at 115° C. for 3 minutes.

| Composition [A]: | |
|---|---|
| Above conductive fine particle dispersion | 10 parts (by weight) |
| Gelatin | 1 part |
| Water | 27 parts |
| Methanol | 60 parts |
| Resorcin | 2 parts |
| Polyoxyethylene nonylphenyl ether | 0.01 part |
| Composition B: | |
| Cellulose triacetate | 1 part |
| Acetone | 70 parts |
| Methanol | 15 parts |
| Dichloromethylene | 10 parts |
| p-Chlorophenol | 4 parts |
| Silica particle (mean particle size: 0.2 μm) | 0.01 part |
| Polysiloxan | 0.005 part |
| $C_{15}H_{31}COOC_{40}H_{81}/C_{50}H_{101}O(CH_2CH_2O)_{16}H$ (8/2 weight ratio, mean particle size: 20 nm, dispersion) | 0.01 part |

4) Heat treatment of Support:

After the subbing layer and the backing layer were coated on the supports in the above manner, the supports were subjected to the heat treatment under the conditions shown in Tables 2 and 3. For the heat treatment, each of the supports was wounded around a core reel having a diameter of 30 cm with the subbing layer side surface being outside.

b 5) Provision of the light-sensitive layer:

Subsequently, light sensitive layers having the following compositions were coated on the subbing layer, in order, to form a multi-layer color light-sensitive material.

Composition of Light Sensitive Layers:

Materials used for the light-sensitive layers are classified as follows:

| | |
|---|---|
| ExC: Cyan coupler | UV: UV absorber |
| ExM: Magenta coupler | HBS: High boiling solvent |
| ExY: Yellow coupler | H: Gelatin hardener |
| ExS: Sensitizing dye | |

The composition and its amount (g/m$^2$) of each of the layers set forth below. The amount of each component means the coating amount. The values for the silver halide emulsion mean the coating amount of silver. As for the sensitizing dyes, the coating amount per mole of the silver halide in the same layer is shown in terms of mole.

| The first layer (antihalation layer): | |
|---|---|
| Black colloidal silver | 0.18 |
| Gelatin | 1.40 |
| ExM-1 | 0.18 |
| ExF-1 | $2.0 \times 10^{-3}$ |

| | |
|---|---|
| HBS-1 | 0.20 |

The second layer (intermediate layer):

| | |
|---|---|
| Emulsion G | silver: 0.065 |
| 2,5-Di-t-pentadecylhydroquinone | 0.18 |
| ExC-2 | 0.020 |
| UV-1 | 0.060 |
| UV-2 | 0.080 |
| UV-3 | 0.10 |
| HBS-1 | 0.10 |
| HBS-2 | 0.020 |
| Gelatin | 1.04 |

The third layer (low-sensitivity red sensitive emulsion layer):

| | |
|---|---|
| Emulsion A | silver: 0.25 |
| Emulsion B | silver: 0.25 |
| ExS-1 | $6.9 \times 10^{-5}$ |
| ExS-2 | $1.8 \times 10^{-5}$ |
| ExS-3 | $3.1 \times 10^{-4}$ |
| ExC-1 | 0.17 |
| ExC-3 | 0.030 |
| ExC-4 | 0.10 |
| ExC-5 | 0.020 |
| ExC-7 | 0.0050 |
| ExC-8 | 0.010 |
| Cpd-2 | 0.025 |
| HBS-1 | 0.10 |
| Gelatin | 0.87 |

The fourth layer (middle-sensitivity red sensitive emulsion layer):

| | |
|---|---|
| Emulsion D | silver: 0.70 |
| ExS-1 | $3.5 \times 10^{-4}$ |
| ExS-2 | $1.6 \times 10^{-5}$ |
| ExS-3 | $5.1 \times 10^{-4}$ |
| ExC-1 | 0.13 |
| ExC-2 | 0.060 |
| ExC-3 | 0.0070 |
| ExC-4 | 0.090 |
| ExC-5 | 0.025 |
| ExC-7 | 0.0010 |
| ExC-8 | 0.0070 |
| Cpd-2 | 0.023 |
| HBS-1 | 0.010 |
| Gelatin | 0.75 |

The fifth layer (high-sensitivity red sensitive emulsion layer):

| | |
|---|---|
| Emulsion E | silver: 1.40 |
| ExS-1 | $2.4 \times 10^{-4}$ |
| ExS-2 | $1.0 \times 10^{-4}$ |
| ExS-3 | $3.4 \times 10^{-4}$ |
| ExC-1 | 0.12 |
| ExC-3 | 0.045 |
| ExC-6 | 0.020 |
| ExC-8 | 0.025 |
| Cpd-2 | 0.050 |
| HBS-1 | 0.22 |
| HBS-2 | 0.10 |
| Gelatin | 1.20 |

The sixth layer (Intermediate layer):

| | |
|---|---|
| Cpd-1 | 0.10 |
| HBS-1 | 0.50 |
| Gelatin | 1.10 |

The seventh layer (low-sensitivity green sensitive emulsion layer):

| | |
|---|---|
| Emulsion C | silver: 0.35 |
| ExS-4 | $3.0 \times 10^{-5}$ |
| ExS-5 | $2.1 \times 10^{-4}$ |
| ExS-6 | $8.0 \times 10^{-4}$ |
| ExM-1 | 0.010 |
| ExM-2 | 0.33 |
| ExM-3 | 0.086 |
| ExY-1 | 0.015 |
| HBS-1 | 0.30 |
| HBS-3 | 0.010 |
| Gelatin | 0.73 |

The eighth layer (middle-sensitivity green sensitive emulsion layer):

| | |
|---|---|
| Emulsion D | silver: 0.80 |
| ExS-4 | $3.2 \times 10^{-5}$ |
| ExS-5 | $2.2 \times 10^{-4}$ |
| ExS-6 | $8.4 \times 10^{-4}$ |
| ExM-2 | 0.13 |
| ExM-3 | 0.030 |
| ExY-1 | 0.018 |
| HBS-1 | 0.16 |
| HBS-3 | $8.0 \times 10^{-3}$ |
| Gelatin | 0.90 |

The ninth layer (high-sensitivity green sensitive emulsion layer):

| | |
|---|---|
| Emulsion E | silver: 1.25 |
| ExS-4 | $3.7 \times 10^{-5}$ |
| ExS-5 | $8.1 \times 10^{-5}$ |
| ExS-6 | $3.2 \times 10^{-4}$ |
| ExC-1 | 0.010 |
| ExM-1 | 0.030 |
| ExM-4 | 0.040 |
| ExM-5 | 0.019 |
| Cpd-3 | 0.040 |
| HBS-1 | 0.25 |
| HBS-2 | 0.10 |
| Gelatin | 1.44 |

The tenth layer (yellow filter layer)

| | |
|---|---|
| Yellow colloidal silver | silver: 0.030 |
| Cpd-1 | 0.16 |
| HBS-1 | 0.60 |
| Gelatin | 0.60 |

The seventh layer (low-sensitivity blue sensitive emulsion layer):

| | |
|---|---|
| Emulsion C | silver: 0.18 |
| ExS-7 | $8.6 \times 10^{-4}$ |
| ExY-1 | 0.020 |
| ExY-2 | 0.22 |
| ExY-3 | 0.50 |
| ExY-4 | 0.020 |
| HBS-1 | 0.28 |
| Gelatin | 1.10 |

The twelfth layer (middle-sensitivity blue sensitive emulsion layer):

| | |
|---|---|
| Emulsion D | silver: 0.40 |
| ExS-7 | $7.4 \times 10^{-4}$ |
| ExC-7 | $7.0 \times 10^{-3}$ |
| ExY-2 | 0.050 |
| ExY-3 | 0.10 |
| HBS-1 | 0.050 |
| Gelatin | 0.78 |

The thirteenth layer (high-sensitivity blue sensitive emulsion layer):

| | |
|---|---|
| Emulsion F | silver: 1.00 |
| ExS-7 | $4.0 \times 10^{-4}$ |
| ExY-2 | 0.010 |
| ExY-3 | 0.010 |
| HBS-1 | 0.070 |
| Gelatin | 0.86 |

The fourteenth layer (first protective layer):

| | |
|---|---|
| Emulsion G | silver: 0.20 |
| UV-4 | 0.11 |
| UV-5 | 0.17 |
| HBS-1 | 0.050 |
| Gelatin | 1.00 |

The fifteenth layer (second protective layer):

| | |
|---|---|
| H-1 | 0.40 |
| B-1 (diameter: 1.7 μm) | 0.050 |
| B-2 (diameter: 1.7 μm) | 0.10 |
| B-3 | 0.10 |
| S-1 | 0.20 |
| Gelatin | 1.20 |

To each layer, the compounds of W-1 to W-3, B-4 to B-6, F-1 to F-17, an iron salt, a lead salt, a gold salt, a platinum salt, an iridium salt and a rhodium salt were appropriately incorporated, in order to improve preservation performance, processing performance, antipressure performance, antimold and fungicidal performance, antistatic performance, and coating performance.

Emulsion composition used in each layer set forth in Table 1.

TABLE 1

| | mean AgI content (%) | mean grain size (μm) | coefficient of variation (%) | diameter/thickness | silver ratio [core/middle/shell] (AgI content) | grain structure/form |
|---|---|---|---|---|---|---|
| A | 4.0 | 0.45 | 27 | 1 | [1/3] (13/1) | double/octahedron |
| B | 8.3 | 0.70 | 14 | 1 | [3/7] (25/2) | double/octahedron |
| C | 2.0 | 0.55 | 25 | 7 | — | even/tabular |
| D | 9.0 | 0.65 | 25 | 6 | [12/25/29] (0/11/8) | triple/tabular |
| E | 9.0 | 0.85 | 23 | 5 | [8/59/33] (0/11/8) | triple/tabular |
| F | 14.5 | 1.25 | 25 | 3 | [37/73] (34/3) | double/tabular |
| G | 1.0 | 0.07 | 15 | 1 | — | even/tabular |

In Table 1;

(1) Emulsions A to F were subjected to a reduction sensitization with thiourea dioxide and thiosulfonic acid in the preparation of the grains according to the examples described in Japanese Patent Provisional Publication No. 2-191938.

(2) Emulsions A to F were subjected to a gold sensitization, a sulfur sensitization and a selenium sensitization in the presence of the spectral sensitizing dyes described in the respective layers and sodium thiocyanate according to the examples of Japanese Patent Provisional Publication No. 3-237450.

(3) Low molecular weight gelatin was used in the preparation of the tabular grains according to the examples described in Japanese Patent Provisional Publication No. 1-158426.

(4) The dislocation lines described in Japanese Patent Provisional Publication No. 3-237450 were observed in the tabular grains and regular crystal grains having a grain structure with a high pressure electron microscope.

The abbreviations of the components used in the respective layers mean the following compounds:

ExC-1

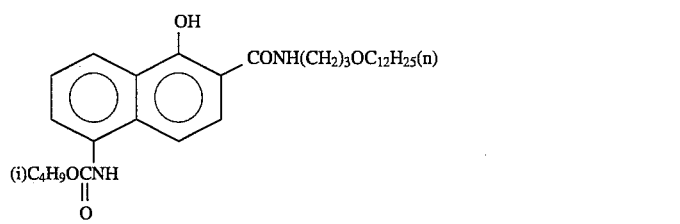

ExC-2

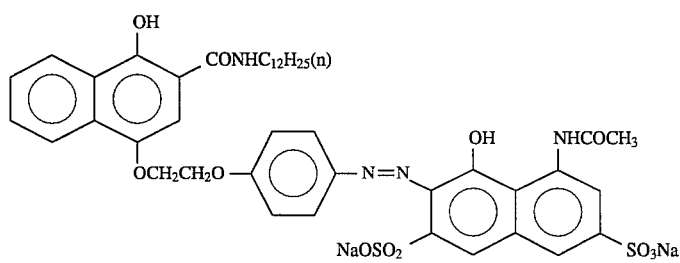

ExC-3

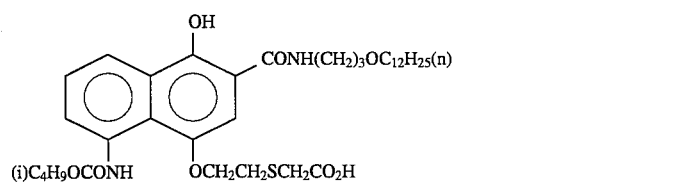

ExC-4

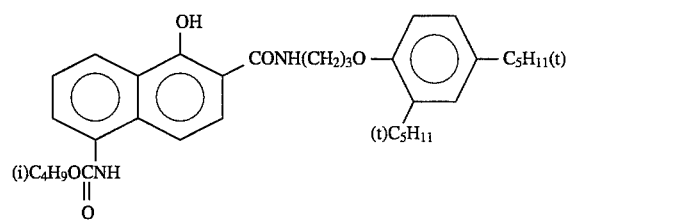

-continued
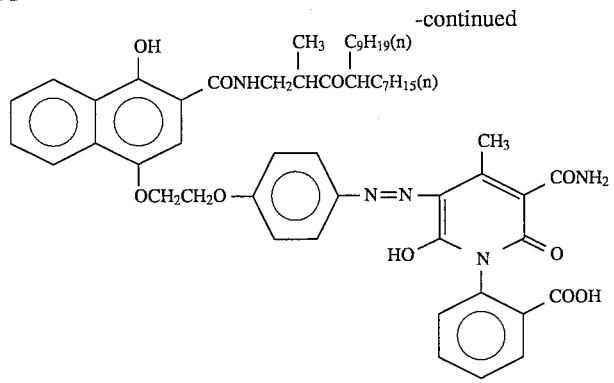
ExC-5
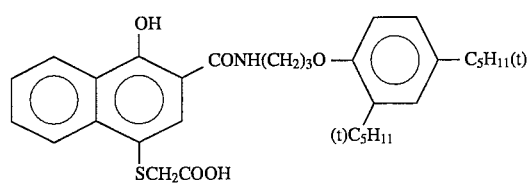
ExC-6
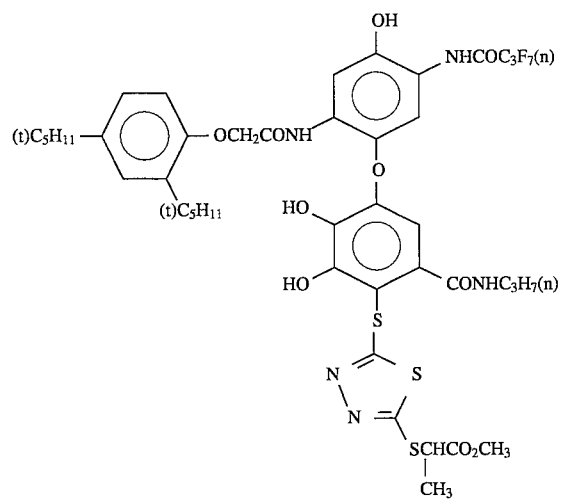
ExC-7
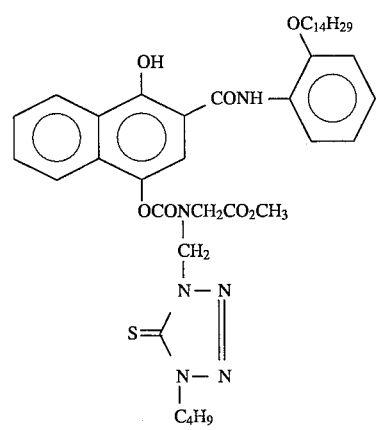
ExC-8

-continued
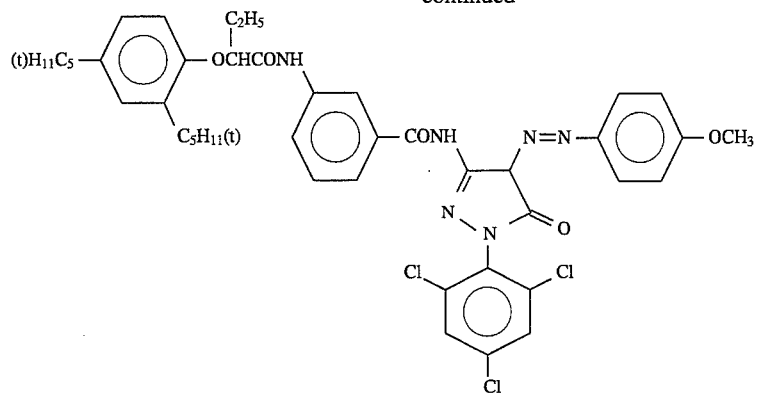
ExM-1
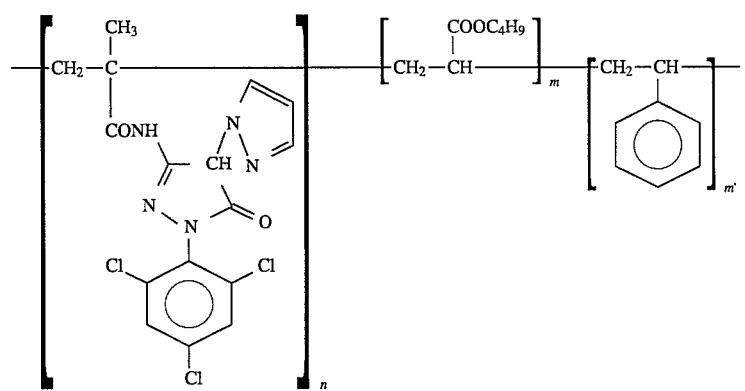
ExM-2
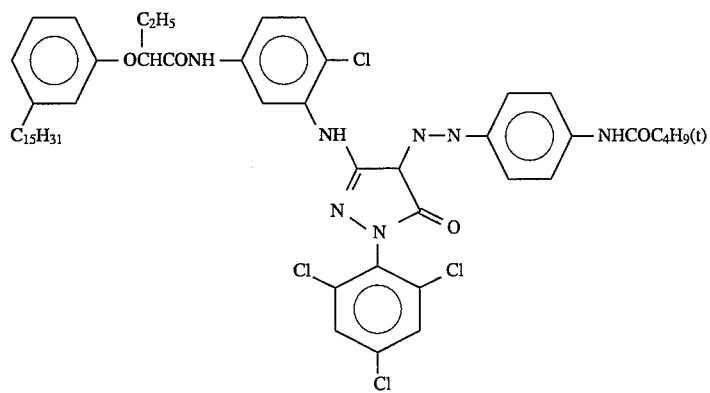
ExM-3
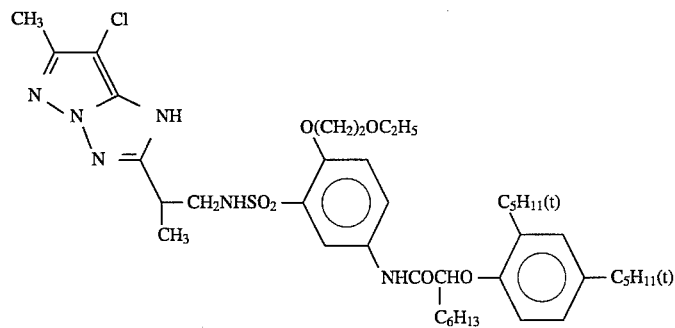
ExM-4

-continued
ExM-5
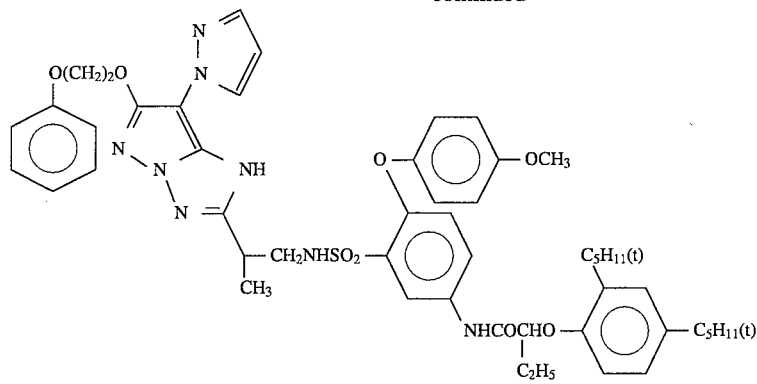
ExY-1
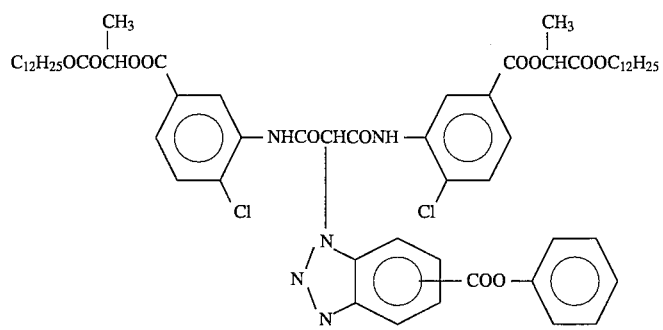
ExY-2
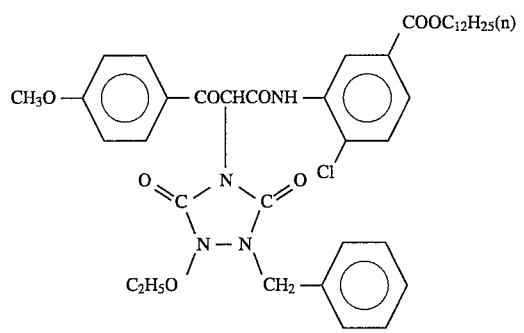
ExY-3
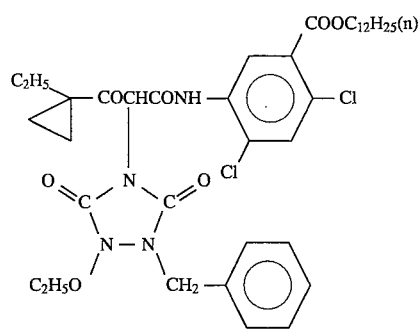
ExY-4
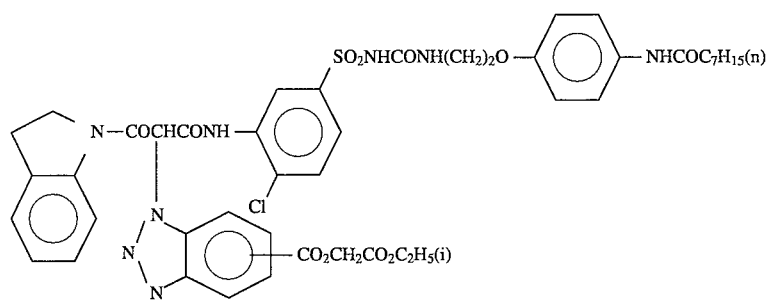

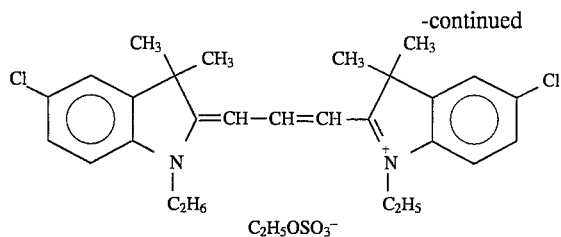
ExF-1
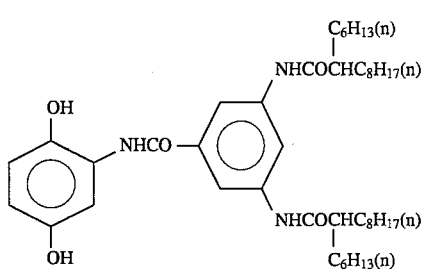
Cpd-1
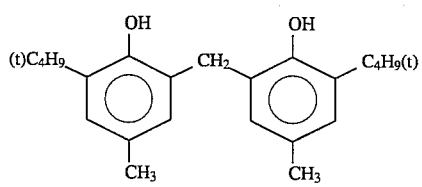
Cpd-2
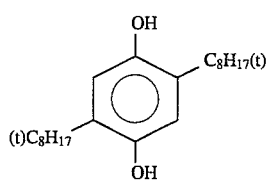
Cpd-3
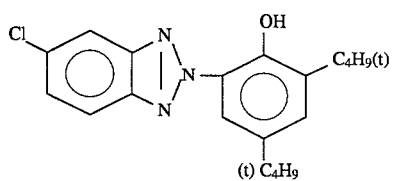
UV-1
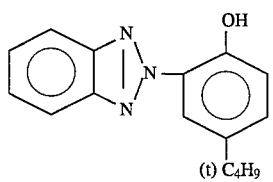
UV-2
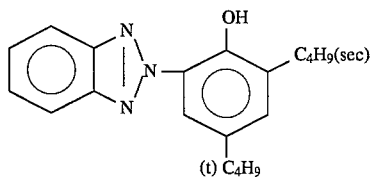
UV-3
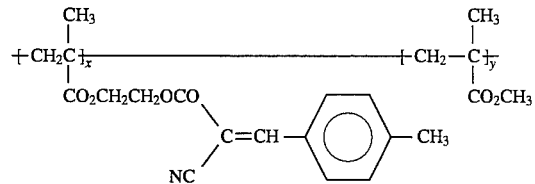
UV-4
x:y = 70:30 (weight %)

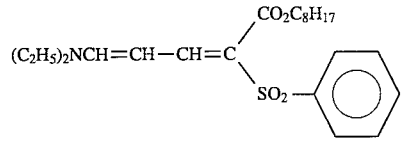
UV-5
Tricresyl phosphate — HBS-1
Di-n-butyl phthalate — HBS-2
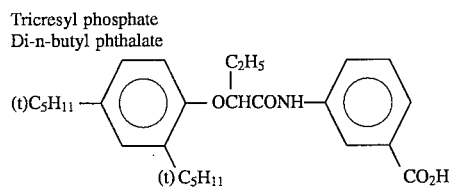
HBS-3
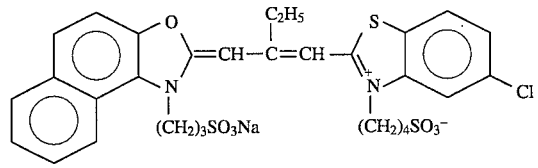
ExS-1
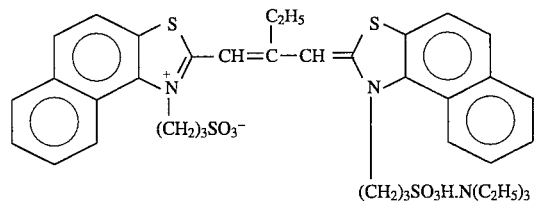
ExS-2
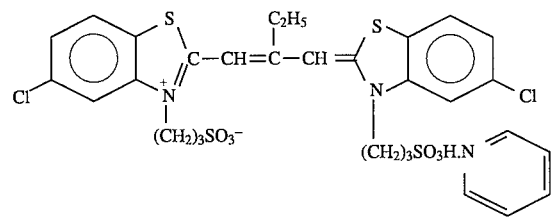
ExS-3
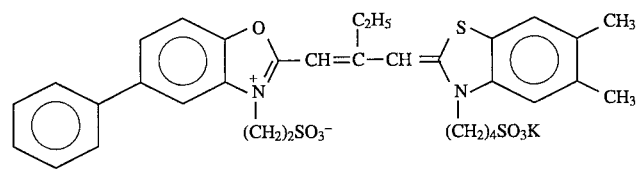
ExS-4
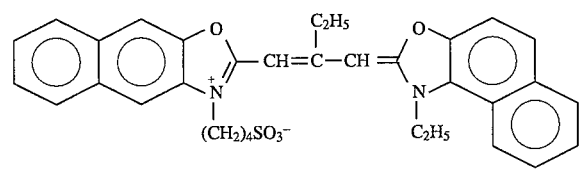
ExS-5
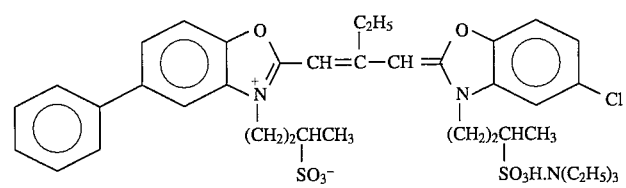
ExS-6
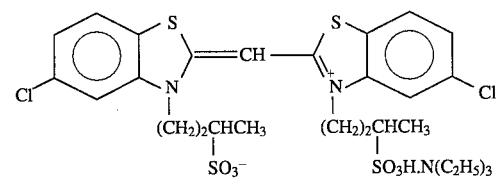
ExS-7

-continued
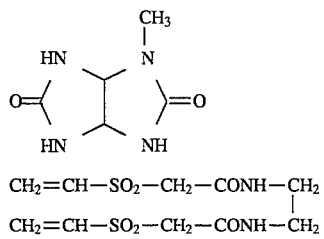 S-1
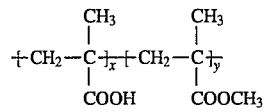 H-1
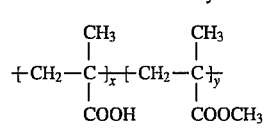 B-1
x/y = 10/90
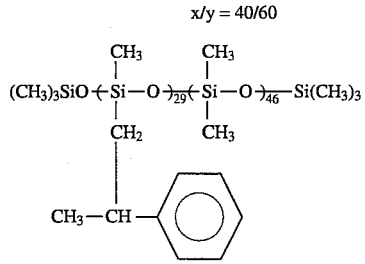 B-2
x/y = 40/60
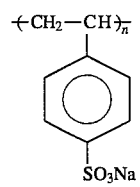 B-3
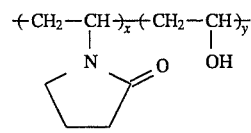 B-4
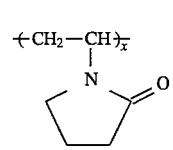 B-5
x/y = 70/30
B-6
Molecular weight = approx. 10,000
-continued
 W-1
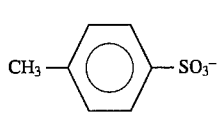 W-2
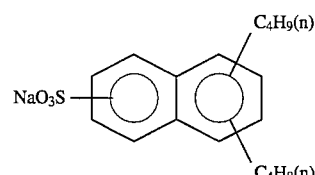 W-3
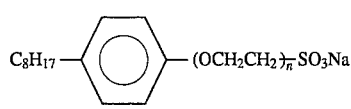
n = 2-4
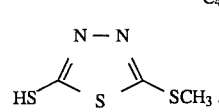 F-1

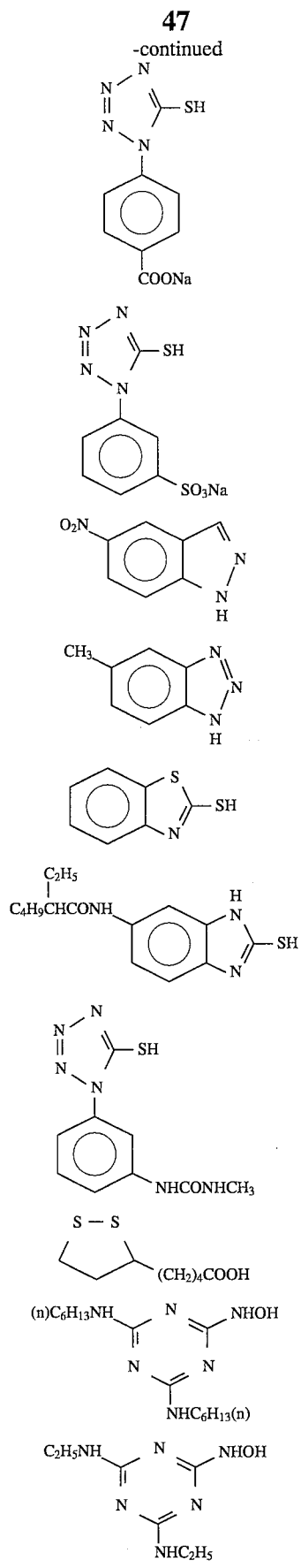

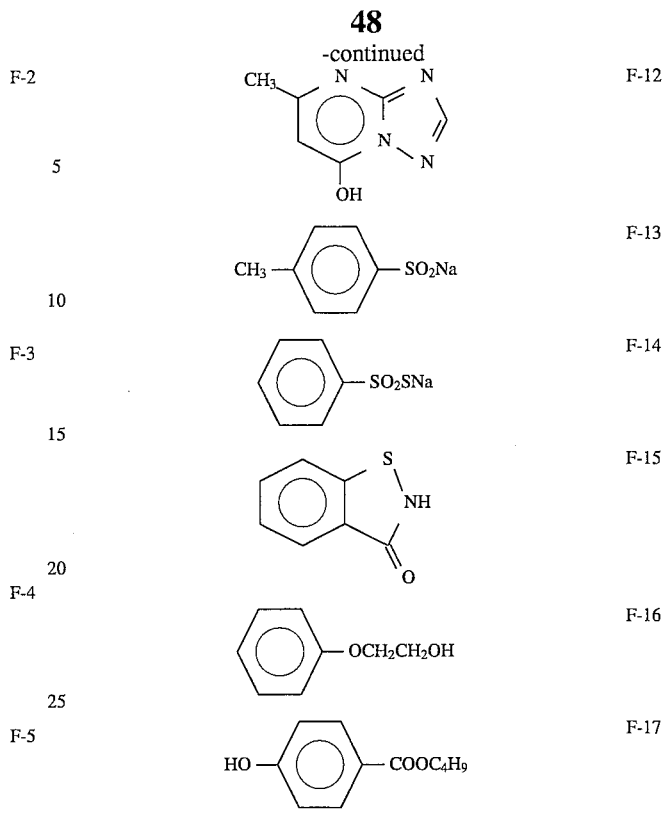

6) Preparation of photographic film-incorporated camera:

The resultant photographic film was slit to the width of 35 mm and the length of 1.8 m. The film was perforated at the both side, and the perforated film was incorporated into the unit shown FIGS. 1 or 2 of the attached drawings. Hence, the wound film has a roll film having a smaller inside diameter compared with that of the roll film of the conventional photographic film-incorporated camera.

7) Core set:

The obtained photographic film-incorporated camera was allowed to stand at 40° C. for 24 hours, to evaluate a core set curling tendency. The standing condition is based on a environment in summer.

8) Evaluation of photographic film-incorporated camera as to a film-tongue-end pulling out operation, evenness in a development and a core set curling tendency:

The photographic film-incorporated camera subjected to the treatment above 7) was cooled by allowing to stand in a room at 25° C. over night. Then, the tongue-end of the film of the camera was pulled using a jig (fixture) to take out the film from the camera. The film was developed using an automatic developing machine (Mini Lab FP-550B manufactured by Fuji Photo Film Co., Ltd.), followed by immediately measuring a value of core set curl at 25° C. and 60% RH. In this procedure, the film-tongue-end pulling out operation and evenness of a development were also evaluated.

The development processing conditions are as follows:

| Processing step | Temperature | Time |
|---|---|---|
| Color developing | 38° C. | 3 minutes |
| Stopping | 38° C. | 1 minutes |
| Washing | 38° C. | 1 minutes |
| Bleaching | 38° C. | 2 minutes |
| Washing | 38° C. | 1 minutes |

| Processing step | Temperature | Time |
| --- | --- | --- |
| Fixing | 38° C. | 2 minutes |
| Washing | 38° C. | 1 minutes |
| Stabilizing | 38° C. | 2 minutes |

The used processing solutions have the following compositions:

Color developing solution:

| | |
| --- | --- |
| Caustic soda | 2 g |
| Sodium sulfite | 2 g |
| Potasium bromide | 0.4 g |
| Sodium chloride | 1 g |
| Borax | 4 g |
| Hydroxylamine sulfate | 2 g |
| Disodium ethylenediaminetetraacetate dihydrate | 2 g |
| 4-Amino-3-methyl-N-ethyl-N-(β-hydroxyethyl)aniline monosulfate | 4 g |
| Water being so added as to the total amount of 1 little | |

Stopping solution:

| | |
| --- | --- |
| Sodium thiosulfate | 10 g |
| Ammonium thiosulfate (70% aqueous solution) | 30 ml |
| Acetic acid | 30 ml |
| Sodium acetate | 5 g |
| Pottasium alum | 15 g |
| Water being so added as to the total amount of 1 little | |

Bleaching solution:

| | |
| --- | --- |
| Iron (III) sodium ethylenediamine-tetraacetate duhydrate | 100 g |
| Potassium bormide | 50 g |
| Ammonium nitrate | 50 g |
| Boric acid | 5 g |
| Ammonia water | adjusting pH to 5.0 |
| Water being so added as to the total amount of 1 little | |

Fixing solution:

| | |
| --- | --- |
| Sodium thiosulfate | 150 g |
| Sodium sulfide | 15 g |
| Borax | 12 g |
| Acetic acid glacial | 15 ml |
| Pottasium alum | 20 g |
| Water being so added as to the total amount of 1 little | |

Stabilizing solution:

| | |
| --- | --- |
| Boric acid | 5 g |
| Sodium citrate | 5 g |
| Sodium methaborate (tetrahydrates) | 3 g |
| Potassium alum | 15 g |
| Water being so added as to the total amount of 1 little | |

The results obtained by the above measurement are set forth in Tables 2 to 6.

TABLE 2

| | Support | | | Supply room Diameter | | Pa-trone | Film | Heat | Tongue | Value | Uneven- | |
| --- | --- | --- | --- | --- | --- | --- | --- | --- | --- | --- | --- | --- |
| Sample No. | Kind | Thickness (μm) | Tg (°C.) | Vacant core (mm) | Spool (mm) | Diameter (mm) | frame number (sheet) | treatment (°C./hrs) | end pulling out | of Curl (ANSI) | ness in development | Breaking of rear edge |
| 1 (Com.) | TAC | 115 | — | — | 9 | 11.5 | 36 | None | Difficult | 140 | None | Observed |
| 2 (Com.) | TAC | 115 | — | — | 7 | 11.5 | 36 | None | Difficult | 163 | None | Observed |
| 3 (Com.) | TAC | 122 | — | 11.97 | — | 11.5 | 36 | None | Difficult | 132 | None | Observed |
| 4 (Com.) | TAC | 115 | — | — | 9 | 9 | 36 | None | Difficult | 176 | None | Observed |
| 5 (Com.) | TAC | 115 | — | — | 7 | 7 | 36 | None | Impossible | 194 | Observed | Observed |
| 6 (Com.) | PET | 90 | 80 | — | 9 | 11.5 | 36 | None | Difficult | 135 | None | Observed |
| 7 (Com.) | PET | 90 | 80 | — | 7 | 11.5 | 36 | None | Difficult | 176 | None | Observed |
| 8 (Com.) | PET | 90 | 80 | 13.02 | — | 11.5 | 36 | None | Difficult | 159 | None | Observed |
| 9 (Com.) | PET | 90 | 80 | — | 9 | 9 | 36 | None | Impossible | 186 | Observed | Observed |
| 10 (Com.) | PET | 90 | 80 | — | 7 | 7 | 36 | None | Impossible | 210 | Observed | Observed |
| 11 (Com.) | PET | 90 | 80 | 13.02 | — | 7 | 36 | None | Impossible | 186 | Observed | Observed |

TABLE 3

| | Support | | | Supply room Diameter | | Pa-trone | Film | Heat | Tongue | Value | Uneven- | |
| --- | --- | --- | --- | --- | --- | --- | --- | --- | --- | --- | --- | --- |
| Sample No. | Kind | Thickness (μm) | Tg (°C.) | Vacant core (mm) | Spool (mm) | Diameter (mm) | frame number (sheet) | treatment (°C./hrs) | end pulling out | of Curl (ANSI) | ness in development | Breaking of rear edge |
| 12 (Ex.) | PET | 90 | 80 | — | 9 | 11.5 | 36 | 75/24 | Easy | 49 | None | None |
| 13 (Ex.) | PET | 90 | 80 | — | 7 | 11.5 | 36 | 75/24 | Easy | 51 | None | None |
| 14 (Ex.) | PET | 90 | 80 | 13.02 | — | 11.5 | 36 | 75/24 | Easy | 45 | None | None |
| 15 (Ex.) | PET | 90 | 80 | — | 9 | 9 | 36 | 75/24 | Easy | 59 | None | None |
| 16 (Ex.) | PET | 90 | 80 | — | 7 | 7 | 36 | 75/24 | Easy | 59 | None | None |
| 17 (Ex.) | PET | 90 | 80 | 13.02 | — | 7 | 36 | 75/24 | Easy | 56 | None | None |
| 18 (Ex.) | PEN | 75 | 119 | — | 9 | 11.5 | 36 | 110/48 | Easy | 42 | None | None |
| 19 (Ex.) | PEN | 75 | 119 | — | 7 | 11.5 | 36 | 110/48 | Easy | 44 | None | None |
| 20 (Ex.) | PEN | 75 | 119 | 13.02 | — | 11.5 | 36 | 110/48 | Easy | 39 | None | None |

TABLE 3-continued

| Sample No. | Support Kind | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Unevenness in development | Breaking of rear edge |
|---|---|---|---|---|---|---|---|---|---|---|---|---|
| 21 (Ex.) | PEN | 75 | 119 | — | 9 | 9 | 36 | 110/48 | Easy | 45 | None | None |
| 22 (Ex.) | PEN | 75 | 119 | — | 7 | 7 | 36 | 110/48 | Easy | 45 | None | None |
| 23 (Ex.) | PEN | 75 | 119 | 13.02 | — | 7 | 36 | 110/48 | Easy | 48 | None | None |

TABLE 4

| Sample No. | Support Kind (wt. %) | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Unevenness in development | Breaking of rear edge |
|---|---|---|---|---|---|---|---|---|---|---|---|---|
| 24 (Ex.) | PEN/PET = 4/1 | 75 | 104 | — | 9 | 11.5 | 36 | 94/48 | Easy | 42 | None | None |
| 25 (Ex.) | PEN/PET = 4/1 | 75 | 104 | — | 7 | 11.5 | 36 | 94/48 | Easy | 44 | None | None |
| 26 (Ex.) | PEN/PET = 4/1 | 75 | 104 | 13.02 | — | 11.5 | 36 | 94/48 | Easy | 38 | None | None |
| 27 (Ex.) | PEN/PET = 4/1 | 75 | 104 | — | 9 | 9 | 36 | 94/48 | Easy | 47 | None | None |
| 28 (Ex.) | PEN/PET = 4/1 | 75 | 104 | — | 7 | 7 | 36 | 94/48 | Easy | 50 | None | None |
| 29 (Ex.) | PEN/PET = 4/1 | 75 | 104 | 13.02 | — | 7 | 36 | 94/48 | Easy | 52 | None | None |
| 30 (Ex.) | TPA/SIP/EG = 9.5/0.5/10 | 90 | 65 | — | 9 | 11.5 | 36 | 50/48 | Easy | 58 | None | None |
| 31 (Ex.) | TPA/SIP/EG = 9.5/0.5/10 | 90 | 65 | — | 7 | 11.5 | 36 | 50/48 | Easy | 60 | None | None |
| 32 (Ex.) | TPA/SIP/EG = 9.5/0.5/10 | 90 | 65 | 13.02 | — | 11.5 | 36 | 50/48 | Easy | 50 | None | None |
| 33 (Ex.) | TPA/SIP/EG = 9.5/0.5/10 | 90 | 65 | — | 9 | 9 | 36 | 50/48 | Easy | 52 | None | None |
| 34 (Ex.) | TPA/SIP/EG = 9.5/0.5/10 | 90 | 65 | — | 7 | 7 | 36 | 50/48 | Easy | 62 | None | None |
| 35 (Ex.) | TPA/SIP/EG = 9.5/0.5/10 | 90 | 65 | 13.02 | — | 7 | 36 | 50/48 | Easy | 59 | None | None |

TABLE 5

| Sample No. | Support Kind (wt. %) | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Unevenness in development | Breaking of rear edge |
|---|---|---|---|---|---|---|---|---|---|---|---|---|
| 36 (Com.) | PEN | 75 | 119 | — | 9 | 11.5 | 36 | None | Difficult | 94 | None | Observed |
| 37 (Com.) | PEN | 75 | 119 | — | 7 | 11.5 | 36 | None | Difficult | 101 | None | Observed |
| 38 (Com.) | PEN | 75 | 119 | 13.02 | — | 11.5 | 36 | None | Difficult | 88 | None | Observed |
| 39 (Com.) | PEN | 75 | 119 | — | 9 | 9 | 36 | None | Difficult | 98 | None | Observed |
| 40 (Com.) | PEN | 75 | 119 | — | 7 | 7 | 36 | None | Difficult | 110 | None | Observed |
| 41 (Com.) | PEN | 75 | 119 | 13.02 | — | 7 | 36 | None | Difficult | 85 | None | Observed |
| 42 (Com.) | PEN/PET = 4/1 | 75 | 104 | — | 9 | 9 | 36 | None | Difficult | 98 | None | Observed |
| 43 (Com.) | PEN/PET = 4/1 | 75 | 104 | — | 7 | 7 | 36 | None | Difficult | 103 | None | Observed |
| 44 (Com.) | PEN/PET = 4/1 | 75 | 104 | 13.02 | — | 7 | 36 | None | Difficult | 95 | None | Observed |
| 45 (Com.) | TPA/SIP/EG = 9.5/0.5/10 | 90 | 65 | — | 9 | 9 | 36 | None | Difficult | 111 | None | Observed |
| 46 (Com.) | TPA/SIP/EG = 9.5/0.5/10 | 90 | 65 | — | 7 | 7 | 36 | None | Difficult | 105 | None | Observed |
| 47 (Com.) | TPA/SIP/EG = 9.5/0.5/10 | 90 | 65 | 13.02 | — | 7 | 36 | None | Difficult | 106 | None | Observed |

TABLE 6

| Sample No. | Support Kind | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Unevenness in development | Breaking of rear edge |
|---|---|---|---|---|---|---|---|---|---|---|---|---|
| 48 (Com.) | PEN | 75 | 119 | — | 9 | 2.8 | 36 | 110/48 | Difficult | 250 | Observed | Observed |
| 49 (Com.) | PEN | 75 | 119 | 7 | — | 2.8 | 36 | 110/48 | Difficult | 245 | Observed | Observed |
| 50 (Com.) | PEN | 75 | 119 | — | 9 | 7 | 36 | 35/240 | Difficult | 239 | Observed | Observed |
| 51 (Com.) | PEN | 75 | 119 | 13.02 | — | 11.5 | 36 | 35/240 | Difficult | 283 | Observed | Observed |

EXAMPLE 2

The procedures of Example 1 were repeated except for forming the subbing layer and the backing layer after the heat treatment of the support, to prepare a photographic film-incorporated camera.

From the results obtained in Examples 1 and 2, the photographic film-incorporated cameras obtained in the examples have a roll film having been subjected to the specific stretching and heat treatment. The film showed a small curl value and then did not produce uneven development and breaking of the rear edge of the film, as well as trouble in film-tongue-end pulling out operation, even though the diameter of the spool is reduced. On the other hand, the photographic film-incorporated cameras (comparison samples) having a roll film comprising TAC film or a polyester film having not been subjected to the heat treatment did not show satisfactory characteristics as shown above.

Further, although photographic film-incorporated cameras using photographic films having PET or PEN support films of thickness of less than 50 μm were prepared, the resultant films were apt to produce a curl and scratch in a developing procedure.

EXAMPLE 3

1) Preparation of the support:

The following supports (a)–(g) were prepared according the processes described below:

(a) PEN support:

The support was prepared in the same manner as that of (a) PEN support in Example 1 to obtain a film having a thickness of 85 μm.

(b) PET support:

The support was prepared in the same manner as that of (b) PET support in Example 1 to obtain a film having a thickness of 90 μm.

(c) Dye-containing PEN support:

The support in which the following dyes were incorporated into the PEN support above (a) was prepared.

In more detail, to 100 Weight parts of a commercially available poly(ethylene-2,6-naphthalate) were added 2 weight parts of UV absorber (Tinuvin P.326 available from Ciba-Guigy Co., Ltd.) and the above-mentioned dye compounds I-1, I-6 and I-15 (2/3/1, weight ratio) to be mixed and the mixture was dried according to a conventional method. The amount of the dye compounds was so added as to allow the increasing amount of a transmission density of the support to have a value of 0.03 within the wavelength region of 400 to 700 nm. The mixture was melted at 300° C. and then extruded from a T type die to prepare a film. The film was stretched up to 3.3 times in a lengthwise direction at 140° C., and stretched up to 3.3 times in a widthwise direction at 130° C., and then was placed at 250° C. for 5 seconds (heat fixation), whereby the film having the thickness of 85 μm was obtained.

(d) Dye-containing PET support:

The support in which the following dyes were incorporated into the PET support above (b) was prepared.

In more detail, to a commercially available poly(ethylene terephthalate) was added the dye compounds I-1, I-6 and I-15 (2/3/1, weight ratio; the increasing amount of a transmission density of 0.03) to be mixed and the mixture melted at 270° C. and then extruded from a T type die to prepare a film. The film was stretched up to 3.3 times in a lengthwise direction at 100° C., and stretched up to 3.3 times in a widthwise direction at 110° C., and then was placed at 220° C. for 5 seconds (heat fixation), whereby the film having the thickness of 90 μm was obtained.

(e) TAC support:

The support was prepared in the same manner as that of (c) TAC support in Example 1.

(f) PEN/PET (4/1, weight ratio) support:

The support was prepared in the same manner as that of (d) PEN/PET support in Example 1.

(g) Support of poly(oxyisophthaloyloxy-2,6-dimethyl-1, 4-phenyleneisopropylidene-3,5-dimethyl-1,4-phenylene) having Tg of 225° C.:

The support of the polymer was produced in the same manner as the process of PEN described above (a). However, the support was colored and therefore was not suitable for a support of a photographic film.

2) Provision of subbing layer:

The subbing layer was formed in the same manner as 2) provision of subbing layer in Example 1.

3) Provision of back layer:

The back layer was formed in the same manner as 3) provision of back layer in Example 1.

4) Heat treatment of Support:

After the subbing layer and the back layer were coated on the supports in the above manner, the supports were subjected to the heat treatment under the conditions shown in Tables 7 and 8. For the heat treatment, each of the supports was wounded around a core reel having a diameter of 30 cm with the subbing layer side surface being outside.

5) Provision of the light-sensitive layer:

Subsequently, light sensitive layers were coated on the subbing layer in the same manner as Example 1, to form a multi-layer color light-sensitive material.

6) Preparation of photographic film-incorporated camera:

The resultant photographic film was slit to the width of 35 mm and the length of 1.8 m. The film was perforated at the both side, and the perforated film was incorporated into the unit shown FIGS. 1 or 2 of the attached drawings. Hence, the wound film has a roll film having a smaller inside diameter compared with that of the roll film of the conventional photographic film-incorporated camera.

7) Core set:

The obtained photographic film-incorporated camera was allowed to stand at 40° C. for 24 hours, to evaluate a core set curling tendency, in the same manner as that of Example 1. The standing condition is based on a environment in summer.

8) Evaluation of photographic film-incorporated camera as to a film-tongue-end pulling out operation, evenness of a development and a core set curling tendency:

The evaluation was carried out in the same manner as that of Example 1. In more detail, the photographic film-incorporated camera subjected to the treatment above 7) was cooled by allowing to stand in a room at 25° C. over night. Then, the tongue-end of the film of the camera was pulled using a jig (fixture) to take out the film from the camera. The film was developed using an automatic developing machine (Mini Lab FP-550B manufactured by Fuji Photo Film Co., Ltd.), followed by immediately measuring a value of core set curl at 25° C. and 60% RH. In this procedure, the film-tongue-end pulling out operation and evenness of a development were also evaluated.

The development processing conditions are the same as those of Example 1.

9) Light-piping (edge fog):

The photographic film in the supply room of the photographic film-incorporated camera was wound up to leave the tongue end portion of length of 20 mm, and then the camera was exposed to a light having about 100,000 lux. The resultant film was subjected to the above development processing to measure the length of fogged area of the film in the cartridge (patrone). The longer length of fogged area means easiness of occurrence of the light-piping.

The results obtained by the above measurement are set forth in Tables 7 to 9.

TABLE 7

| Sample No. | Support Kind | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Unevenness in development | Breaking of rear edge |
|---|---|---|---|---|---|---|---|---|---|---|---|---|
| 52 (Com.) | TAC | 115 | — | — | 9 | 11.5 | 36 | None | Difficult | 135 | None | Observed |
| 53 (Com.) | TAC | 115 | — | — | 7 | 11.5 | 36 | None | Difficult | 160 | None | Observed |
| 54 (Com.) | TAC | 122 | — | 12 | — | 11.5 | 36 | None | Difficult | 130 | None | Observed |
| 55 (Com.) | TAC | 115 | — | — | 9 | 9 | 36 | None | Difficult | 172 | None | Observed |
| 56 (Com.) | TAC | 115 | — | — | 7 | 7 | 36 | None | Impossible | 190 | Observed | Observed |
| 57 (Com.) | PET | 90 | 80 | — | 9 | 11.5 | 36 | None | Difficult | 133 | None | Observed |
| 58 (Com.) | PET | 90 | 80 | — | 7 | 11.5 | 36 | None | Difficult | 175 | None | Observed |
| 59 (Com.) | PET | 90 | 80 | 13 | — | 11.5 | 36 | None | Difficult | 158 | None | Observed |
| 60 (Com.) | PET | 90 | 80 | — | 9 | 9 | 36 | None | Impossible | 183 | Observed | Observed |
| 61 (Com.) | PET | 90 | 80 | — | 7 | 7 | 36 | None | Impossible | 200 | Observed | Observed |
| 62 (Com.) | PET | 90 | 80 | 13 | — | 7 | 36 | None | Impossible | 184 | Observed | Observed |
| 63 (Ex.) | PEN | 85 | 120 | — | 9 | 11.5 | 36 | None | Difficult | 95 | None | Observed |
| 64 (Ex.) | PEN | 85 | 120 | — | 7 | 11.5 | 36 | None | Difficult | 103 | None | Observed |
| 65 (Ex.) | PEN | 85 | 120 | 13 | — | 11.5 | 36 | None | Difficult | 92 | None | Observed |
| 66 (Ex.) | PEN | 85 | 120 | — | 9 | 9 | 36 | None | Difficult | 98 | None | Observed |
| 67 (Ex.) | PEN | 85 | 120 | — | 7 | 7 | 36 | None | Difficult | 104 | None | Observed |
| 68 (Ex.) | PEN | 85 | 120 | 13 | — | 7 | 36 | None | Difficult | 102 | None | Observed |

TABLE 8

| Sample No. | Support Kind | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Unevenness in development | Breaking of rear edge | Dye | L.P. (mm) |
|---|---|---|---|---|---|---|---|---|---|---|---|---|---|---|
| 69 (Ex.) | PET | 90 | 80 | — | 9 | 11.5 | 36 | 75/24 | Easy | 45 | None | None | None | 25 |
| 70 (Ex.) | PET | 90 | 80 | — | 7 | 11.5 | 36 | 75/24 | Easy | 50 | None | None | None | 25 |
| 71 (Ex.) | PET | 90 | 80 | 13 | — | 11.5 | 36 | 75/24 | Easy | 43 | None | None | None | 25 |
| 72 (Ex.) | PET | 90 | 80 | — | 9 | 9 | 36 | 75/24 | Easy | 52 | None | None | None | 25 |
| 73 (Ex.) | PET | 90 | 80 | — | 7 | 7 | 36 | 75/24 | Easy | 55 | None | None | None | 25 |
| 74 (Ex.) | PET | 90 | 80 | 13 | — | 7 | 36 | 75/24 | Easy | 55 | None | None | None | 25 |
| 75 (Ex.) | PET | 90 | 80 | — | 9 | 11.5 | 36 | 75/24 | Easy | 45 | None | None | Contained | 0.5 |
| 76 (Ex.) | PET | 90 | 80 | — | 7 | 11.5 | 36 | 75/24 | Easy | 48 | None | None | Contained | 0.5 |
| 77 (Ex.) | PET | 90 | 80 | 13 | — | 11.5 | 36 | 75/24 | Easy | 44 | None | None | Contained | 0.5 |
| 78 (Ex.) | PET | 90 | 80 | — | 9 | 9 | 36 | 75/24 | Easy | 51 | None | None | Contained | 0.5 |
| 79 (Ex.) | PET | 90 | 80 | — | 7 | 7 | 36 | 75/24 | Easy | 56 | None | None | Contained | 0.5 |
| 80 (Ex.) | PET | 90 | 80 | 13 | — | 7 | 36 | 75/24 | Easy | 55 | None | None | Contained | 0.5 |
| 81 (Ex.) | PEN | 85 | 120 | — | 9 | 11.5 | 36 | 110/48 | Easy | 40 | None | None | None | 28 |
| 82 (Ex.) | PEN | 85 | 120 | — | 7 | 11.5 | 36 | 110/48 | Easy | 45 | None | None | None | 28 |
| 83 (Ex.) | PEN | 85 | 120 | 13 | — | 11.5 | 36 | 110/48 | Easy | 38 | None | None | None | 28 |
| 84 (Ex.) | PEN | 85 | 120 | — | 9 | 9 | 36 | 110/48 | Easy | 40 | None | None | None | 28 |
| 85 (Ex.) | PEN | 85 | 120 | — | 7 | 7 | 36 | 110/48 | Easy | 49 | None | None | None | 28 |
| 86 (Ex.) | PEN | 85 | 120 | 13 | — | 7 | 36 | 110/48 | Easy | 48 | None | None | None | 28 |
| 87 (Com.) | PEN | 85 | 120 | — | 2.8 | 2.8 | 36 | 110/48 | Difficult | 245 | Observed | Observed | None | 28 |
| 88 (Com.) | PEN | 85 | 120 | 13 | — | 11.5 | 36 | 35/240 | Difficult | 277 | Observed | Observed | Contained | 0.7 |
| 89 (Com.) | PEN | 85 | 120 | — | 2.8 | 2.8 | 36 | 110/48 | Difficult | 246 | Observed | Observed | None | 28 |
| 90 (Com.) | PEN | 85 | 120 | 13 | — | 11.5 | 36 | 35/240 | Difficult | 275 | Observed | Observed | Contained | 0.7 |
| 91 (Ex.) | PEN | 85 | 120 | — | 9 | 11.5 | 36 | 110/48 | Easy | 40 | None | None | Contained | 0.7 |
| 92 (Ex.) | PEN | 85 | 120 | — | 7 | 11.5 | 36 | 110/48 | Easy | 45 | None | None | Contained | 0.7 |
| 93 (Ex.) | PEN | 85 | 120 | 13 | — | 11.5 | 36 | 110/48 | Easy | 36 | None | None | Contained | 0.7 |
| 94 (Ex.) | PEN | 85 | 120 | — | 9 | 9 | 36 | 110/48 | Easy | 40 | None | None | Contained | 0.7 |
| 95 (Ex.) | PEN | 85 | 120 | — | 7 | 7 | 36 | 110/48 | Easy | 50 | None | None | Contained | 0.7 |
| 96 (Ex.) | PEN | 85 | 120 | — | 7 | 7 | 72 | 110/48 | Easy | 58 | None | None | Contained | 0.7 |
| 97 (Ex.) | PEN | 85 | 120 | 7 | — | 7 | 72 | 110/48 | Easy | 57 | None | None | Contained | 0.7 |
| 98 (Ex.) | PEN | 85 | 120 | 13 | — | 7 | 36 | 110/48 | Easy | 48 | None | None | Contained | 0.7 |

TABLE 9

| Sample No. | Support Kind (wt. %) | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Unevenness in development | Breaking of rear edge | Dye | L.P. (mm) |
|---|---|---|---|---|---|---|---|---|---|---|---|---|---|---|
| 99 (Ex.) | PEN/PET = 4/1 | 85 | 104 | — | 9 | 11.5 | 36 | 94/48 | Easy | 46 | None | None | None | 26 |
| 100 (Ex.) | PEN/PET = 4/1 | 85 | 104 | — | 7 | 11.5 | 36 | 94/48 | Easy | 52 | None | None | None | 26 |
| 101 (Ex.) | PEN/PET = 4/1 | 85 | 104 | 13 | — | 11.5 | 36 | 94/48 | Easy | 45 | None | None | None | 26 |
| 102 (Ex.) | PEN/PET = 4/1 | 85 | 104 | — | 9 | 9 | 36 | 94/48 | Easy | 53 | None | None | None | 26 |
| 103 (Ex.) | PEN/PET = 4/1 | 85 | 104 | — | 7 | 7 | 36 | 94/48 | Easy | 56 | None | None | None | 26 |
| 104 (Ex.) | PEN/PET = 4/1 | 85 | 104 | 13 | — | 7 | 36 | 94/48 | Easy | 56 | None | None | None | 26 |

TABLE 9-continued

| Sample No. | Support Kind (wt. %) | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Un-evenness in development | Breaking of rear edge | Dye | L.P. (mm) |
|---|---|---|---|---|---|---|---|---|---|---|---|---|---|---|
| 105 (Ex.) | PEN/PET = 4/1 | 85 | 104 | — | 9 | 11.5 | 36 | 94/48 | Easy | 45 | None | None | Contained | 0.6 |
| 106 (Ex.) | PEN/PET = 4/1 | 85 | 104 | — | 7 | 11.5 | 36 | 94/48 | Easy | 50 | None | None | Contained | 0.6 |
| 107 (Ex.) | PEN/PET = 4/1 | 85 | 104 | 13 | — | 11.5 | 36 | 94/48 | Easy | 44 | None | None | Contained | 0.6 |
| 108 (Ex.) | PEN/PET = 4/1 | 85 | 104 | — | 9 | 9 | 36 | 94/48 | Easy | 52 | None | None | Contained | 0.6 |
| 109 (Ex.) | PEN/PET = 4/1 | 85 | 104 | — | 7 | 7 | 36 | 94/48 | Easy | 57 | None | None | Contained | 0.6 |
| 110 (Ex.) | PEN/PET = 4/1 | 85 | 104 | 13 | — | 7 | 36 | 94/48 | Easy | 56 | None | None | Contained | 0.6 |

EXAMPLE 4

The procedures of Example 3 were repeated except for forming the subbing layer and the backing layer after the heat treatment of the support, to prepare a photographic film-incorporated camera.

From the results obtained in Examples 3 and 4, the photographic film-incorporated cameras obtained in the examples have a roll film having been subjected to the specific stretching and heat treatment. The film showed a small curl value and then did not produce uneven development and breaking of the rear edge of the film, as well as trouble in film-tongue-end pulling out operation, even though the diameter of the spool was reduced. Further, the films containing dye were excellent in the light-piping (edge fog).

On the other hand, the photographic film-incorporated cameras (comparison samples) having a roll film comprising TAC film or a polyester film having not been subjected to the heat treatment did not show satisfactory characteristics as shown above.

EXAMPLE 5

The procedures of Example 3 were repeated except for using the dye compounds I-12 and II-4 (1/1, weight ratio) instead of the dye compounds I-1, I-6 and I-15 (2/3/1, weight ratio), to prepare a photographic film-incorporated camera.

The results obtained in Example 5 were similar to those obtained in Example 3.

EXAMPLE 6

The procedures of Example 3 were repeated except for using titanium dioxide, carbon black or barium sulfate of 0.01 weight % per polyester instead of the dye compounds I-1, I-6 and I-15 (2/3/1, weight ratio), to prepare a photographic film-incorporated camera.

The result of each compound obtained in Example 6 were similar to those obtained in Example 3.

EXAMPLE 7

The procedures of Example 3 were repeated except for using polymers shown in the following Table 10 as polyester, to prepare a photographic film-incorporated camera.

The results are set forth in Table 10.

TABLE 10

| Sample No. | Support Kind (wt. %) | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Un-evenness in development | Breaking of rear edge | Dye | L.P. (mm) |
|---|---|---|---|---|---|---|---|---|---|---|---|---|---|---|
| 111 (Ex.) | PEN/PET = 6/4 | 85 | 95 | — | 7 | 7 | 36 | 85/48 | Easy | 57 | None | None | None | 26 |
| 112 (Ex.) | PEN/PET = 6/4 | 85 | 95 | — | 7 | 7 | 36 | 85/48 | Easy | 57 | None | None | Contained | 0.6 |
| 113 (Ex.) | PAr/PCT = 5/5 | 85 | 118 | — | 7 | 7 | 36 | 108/48 | Easy | 48 | None | None | None | 26 |
| 114 (Ex.) | PAr/PCT = 5/5 | 85 | 118 | — | 7 | 7 | 36 | 108/48 | Easy | 48 | None | None | Contained | 0.6 |
| 115 (Ex.) | PAr | 85 | 192 | — | 7 | 7 | 36 | 182/48 | Easy | 40 | None | None | None | 32 |
| 116 (Ex.) | PAr | 85 | 192 | — | 7 | 7 | 36 | 182/48 | Easy | 40 | None | None | Contained | 0.7 |
| 117 (Ex.) | NDCA/TPA/EG = 75/25/100 | 85 | 102 | — | 7 | 7 | 36 | 92/48 | Easy | 55 | None | None | None | 26 |

TABLE 10-continued

| Sample No. | Support Kind (wt. %) | Thickness (μm) | Tg (°C.) | Supply room Diameter Vacant core (mm) | Spool (mm) | Patrone Diameter (mm) | Film frame number (sheet) | Heat treatment (°C./hrs) | Tongue end pulling out | Value of Curl (ANSI) | Unevenness in development | Breaking of rear edge | Dye | L.P. (mm) |
|---|---|---|---|---|---|---|---|---|---|---|---|---|---|---|
| 118 (Ex.) | NDCA/TPA/EG = 75/25/100 | 85 | 102 | — | 7 | 7 | 36 | 92/48 | Easy | 55 | None | None | Contained | 0.6 |
| 119 (Ex.) | NDCA/TPA/EG = 50/50/100 | 85 | 92 | — | 7 | 7 | 36 | 82/48 | Easy | 59 | None | None | None | 26 |
| 120 (Ex.) | NDCA/TPA/EG = 50/50/100 | 85 | 92 | — | 7 | 7 | 36 | 82/48 | Easy | 59 | None | None | Contained | 0.6 |
| 121 (Ex.) | TPA/EG/CHDM/BPA = 100/25/25/50 | 85 | 112 | — | 7 | 7 | 36 | 102/48 | Easy | 56 | None | None | None | 26 |
| 122 (Ex.) | TPA/EG/CHDM/BPA = 100/25/25/50 | 85 | 112 | — | 7 | 7 | 36 | 102/48 | Easy | 56 | None | None | Contained | 0.6 |

EXAMPLE 8

The procedures of Example 3 were repeated except for using the following compositions as those of a light-sensitive layer, to prepare a photographic film-incorporated camera.

Composition of Light Sensitive Layers:

The composition and its amount (g/m$^2$) of each of the layers set forth below. The amount of each component means the coating amount. The values for the silver halide emulsion mean the coating amount of silver. As for the sensitizing dyes, the coating amount per mole of the silver halide in the same layer is shown in terms of mole.

| The first layer (antihalation layer): | |
|---|---|
| Black colloidal silver | 0.18 |
| Gelatin | 1.40 |
| ExM-1 | 0.18 |
| ExF-1 | 2.0 × 10$^{-3}$ |
| HBS-1 | 0.20 |
| The second layer (intermediate layer): | |
| Emulsion G | silver: 0.065 |
| 2,5-Di-t-pentadecylhydroquinone | 0.18 |
| ExC-2 | 0.020 |
| UV-1 | 0.060 |
| UV-2 | 0.080 |
| UV-3 | 0.10 |
| HBS-1 | 0.10 |
| HBS-2 | 0.020 |
| Gelatin | 1.04 |
| The third layer (low-sensitivity red sensitive emulsion layer): | |
| Emulsion A | silver: 0.25 |
| Emulsion B | silver: 0.25 |
| ExS-1 | 4.5 × 10$^{-4}$ |
| ExS-2 | 1.5 × 10$^{-5}$ |
| ExS-3 | 4.5 × 10$^{-4}$ |
| ExC-1 | 0.17 |
| ExC-3 | 0.030 |
| ExC-4 | 0.10 |
| ExC-5 | 0.0050 |
| ExC-7 | 0.0050 |
| ExC-8 | 0.020 |
| Cpd-2 | 0.025 |
| HBS-1 | 0.10 |
| Gelatin | 0.87 |
| The fourth layer (middle-sensitivity red sensitive emulsion layer): | |
| Emulsion D | silver: 0.70 |
| ExS-1 | 3.0 × 10$^{-4}$ |
| ExS-2 | 1.2 × 10$^{-5}$ |
| ExS-3 | 4.0 × 10$^{-4}$ |
| ExC-1 | 0.15 |
| ExC-2 | 0.060 |
| ExC-4 | 0.11 |
| ExC-7 | 0.0010 |
| ExC-8 | 0.025 |
| Cpd-2 | 0.023 |
| HBS-1 | 0.010 |
| Gelatin | 0.75 |
| The fifth layer (high-sensitivity red sensitive emulsion layer): | |
| Emulsion E | silver: 1.40 |
| ExS-1 | 2.4 × 10$^{-4}$ |
| ExS-2 | 1.0 × 10$^{-5}$ |
| ExS-3 | 3.0 × 10$^{-4}$ |
| ExC-1 | 0.095 |
| ExC-3 | 0.040 |
| ExC-6 | 0.020 |
| ExC-8 | 0.007 |
| Cpd-2 | 0.050 |
| HBS-1 | 0.22 |
| HBS-2 | 0.10 |
| Gelatin | 1.20 |
| The sixth layer (intermediate layer): | |
| Cpd-1 | 0.10 |
| HBS-1 | 0.50 |
| Gelatin | 1.10 |
| The seventh layer (low-sensitivity green sensitive emulsion layer): | |
| Emulsion A | silver: 0.17 |
| Emulsion B | silver: 0.17 |
| ExS-4 | 4.0 × 10$^{-5}$ |
| ExS-5 | 1.8 × 10$^{-4}$ |
| ExS-6 | 6.5 × 10$^{-4}$ |
| ExM-1 | 0.010 |
| ExM-2 | 0.33 |
| ExM-3 | 0.086 |
| ExY-1 | 0.015 |
| HBS-1 | 0.30 |
| HBS-3 | 0.010 |
| Gelatin | 0.73 |
| The eighth layer (middle-sensitivity green sensitive emulsion layer): | |
| Emulsion D | silver: 0.80 |
| ExS-4 | 2.0 × 10$^{-5}$ |
| ExS-5 | 1.4 × 10$^{-4}$ |
| ExS-6 | 5.4 × 10$^{-4}$ |
| ExM-2 | 0.16 |
| ExM-3 | 0.045 |
| ExY-1 | 0.010 |
| ExY-5 | 0.030 |
| HBS-1 | 0.16 |
| HBS-3 | 8.0 × 10$^{-3}$ |

-continued

| | | |
|---|---|---|
| Gelatin | | 0.90 |

The ninth layer (high-sensitivity green sensitive emulsion layer):

| | | |
|---|---|---|
| Emulsion E | silver: | 1.25 |
| ExS-4 | | $3.7 \times 10^{-5}$ |
| ExS-5 | | $8.1 \times 10^{-5}$ |
| ExS-6 | | $3.2 \times 10^{-4}$ |
| ExC-1 | | 0.010 |
| ExM-1 | | 0.015 |
| ExM-4 | | 0.040 |
| ExM-5 | | 0.019 |
| Cpd-3 | | 0.020 |
| HBS-1 | | 0.25 |
| HBS-2 | | 0.10 |
| Gelatin | | 1.44 |

The tenth layer (yellow filter layer)

| | | |
|---|---|---|
| Yellow colloidal silver | silver: | 0.010 |
| Cpd-1 | | 0.16 |
| HBS-1 | | 0.60 |
| Gelatin | | 0.60 |

The seventh layer (low-sensitivity blue sensitive emulsion layer):

| | | |
|---|---|---|
| Emulsion C | silver: | 0.25 |
| Emulsion D | silver: | 0.40 |
| ExS-7 | | $8.0 \times 10^{-4}$ |
| ExY-1 | | 0.030 |
| ExY-2 | | 0.55 |
| ExY-3 | | 0.25 |
| ExY-4 | | 0.020 |
| ExC-7 | | 0.010 |
| HBS-1 | | 0.28 |
| Gelatin | | 1.30 |

The twelfth layer (high-sensitivity blue sensitive emulsion layer):

| | | |
|---|---|---|
| Emulsion F | silver: | 1.00 |
| ExS-7 | | $3.0 \times 10^{-4}$ |
| ExY-2 | | 0.10 |
| ExY-3 | | 0.10 |
| HBS-1 | | 0.070 |
| Gelatin | | 0.86 |

The thirteenth layer (first protective layer):

| | | |
|---|---|---|
| Emulsion G | silver: | 0.20 |
| UV-4 | | 0.11 |
| UV-5 | | 0.17 |
| HBS-1 | | 0.050 |
| Gelatin | | 1.00 |

The fourteenth layer (second protective layer):

| | | |
|---|---|---|
| H-1 | | 0.40 |
| B-1 (diameter: 1.7 μm) | | 0.050 |
| B-2 (diameter: 1.7 μm) | | 0.10 |
| B-3 | | 0.10 |
| S-1 | | 0.20 |
| Gelatin | | 1.20 |

The results are set forth in Tables 12 and 13.

To each layer, the compounds of W-1 to W-3, B-4 to B-6, F-1 to F-17, an iron salt, a lead salt, a gold salt, a platinum salt, an iridium salt and a rhodium salt were appropriately incorporated, in order to improve preservation performance, processing performance, antipressure performance, antimold and fungicidal performance, antistatic performance, and coating performance.

Emulsion composition used in each layer set forth in Table 11.

TABLE 11

| | mean AgI content (%) | mean grain size (μm) | coefficient of variation (%) | diameter/ thickness | silver ratio [core/middle /shell] (AgI content) | grain structure/ form |
|---|---|---|---|---|---|---|
| A | 1.5 | 0.30 | 10 | 1 | [1/1] (1/2) | double/cube |
| B | 1.5 | 0.50 | 8 | 1 | [1/1] (1/2) | double/cube |
| C | 3.0 | 0.45 | 25 | 7 | [10/60/30] (0/1/8) | triple/tabular |
| D | 2.8 | 0.80 | 18 | 6 | [14/56/30] (0.2/1/7.5) | triple/tabular |
| E | 2.3 | 1.10 | 16 | 6 | [6/64/30] (0.2/1/5.5) | triple/tabular |
| F | 13.6 | 1.75 | 26 | 3 | [1/2] (41/0) | double/tabular |
| G | 1.0 | 0.07 | 15 | 1 | — | even/tabular |

In Table 11;

(1) Emulsions A to F were subjected to a reduction sensitization with thiourea dioxide and thiosulfonic acid in the preparation of the grains according to the examples described in Japanese Patent Provisional Publication No. 2-191938.

(2) Emulsions A to F were subjected to a gold sensitization, a sulfur sensitization and a selenium sensitization in the presence of the spectral sensitizing dyes described in the respective layers and sodium thiocyanate according to the examples of Japanese Patent Provisional Publication No. 3-237450.

(3) Low molecular weight gelatin was used in the preparation of the tabular grains according to the examples described in Japanese Patent Provisional Publication No. 1-158426.

(4) The dislocation lines described in Japanese Patent Provisional Publication No. 3-237450 were observed in the tabular grains with a high pressure electron microscope.

The abbreviations of the components used in the respective layers of Example 8 represent meanings as defined in Example 1 except the following ExY-5.

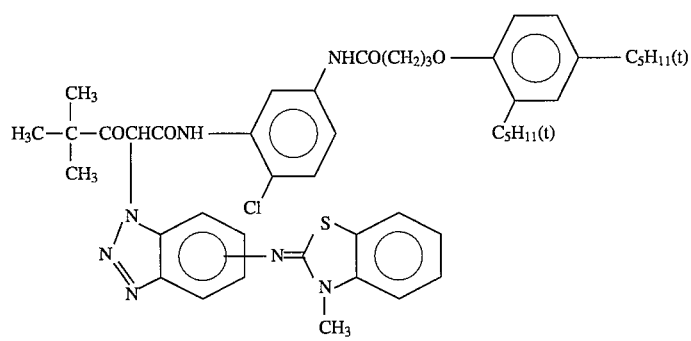

ExY-5

TABLE 12

| Sample No. | Support Kind | Thickness (μm) | Tg (°C.) | Supply room Diameter Vacant core (mm) | Spool (mm) | Patrone Diameter (mm) | Film frame number (sheet) | Heat treatment (°C./hrs) | Tongue end pulling out | Value of Curl (ANSI) | Unevenness in development | Breaking of rear edge |
|---|---|---|---|---|---|---|---|---|---|---|---|---|
| 123 (Com.) | TAC | 115 | — | — | 9 | 11.5 | 36 | None | Difficult | 133 | None | Observed |
| 124 (Com.) | TAC | 115 | — | — | 7 | 11.5 | 36 | None | Difficult | 161 | None | Observed |
| 125 (Com.) | TAC | 122 | — | 12 | — | 11.5 | 36 | None | Difficult | 128 | None | Observed |
| 126 (Com.) | TAC | 115 | — | — | 9 | 9 | 36 | None | Difficult | 175 | None | Observed |
| 127 (Com.) | TAC | 115 | — | — | 7 | 7 | 36 | None | Impossible | 192 | Observed | Observed |
| 128 (Com.) | PET | 90 | 80 | — | 9 | 11.5 | 36 | None | Difficult | 135 | None | Observed |
| 129 (Com.) | PET | 90 | 80 | — | 7 | 11.5 | 36 | None | Difficult | 176 | None | Observed |
| 130 (Com.) | PET | 90 | 80 | 13 | — | 11.5 | 36 | None | Difficult | 157 | None | Observed |
| 131 (Com.) | PET | 90 | 80 | — | 9 | 9 | 36 | None | Impossible | 188 | Observed | Observed |
| 132 (Com.) | PET | 90 | 80 | — | 7 | 7 | 36 | None | Impossible | 202 | Observed | Observed |
| 133 (Com.) | PET | 90 | 80 | 13 | — | 7 | 36 | None | Impossible | 185 | Observed | Observed |
| 134 (Com.) | PEN | 85 | 120 | — | 9 | 11.5 | 36 | None | Difficult | 93 | None | Observed |
| 135 (Com.) | PEN | 85 | 120 | — | 7 | 11.5 | 36 | None | Difficult | 102 | None | Observed |
| 136 (Com.) | PEN | 85 | 120 | 13 | — | 11.5 | 36 | None | Difficult | 94 | None | Observed |
| 137 (Com.) | PEN | 85 | 120 | — | 9 | 9 | 36 | None | Difficult | 95 | None | Observed |
| 138 (Com.) | PEN | 85 | 120 | — | 7 | 7 | 36 | None | Difficult | 103 | None | Observed |
| 139 (Com.) | PEN | 85 | 120 | 13 | — | 7 | 36 | None | Difficult | 104 | None | Observed |

TABLE 13

| Sample No. | Support Kind | Thickness (μm) | Tg (°C.) | Supply room Diameter Vacant core (mm) | Spool (mm) | Patrone Diameter (mm) | Film frame number (sheet) | Heat treatment (°C./hrs) | Tongue end pulling out | Value of Curl (ANSI) | Unevenness in development | Breaking of rear edge | Dye | L.P. (mm) |
|---|---|---|---|---|---|---|---|---|---|---|---|---|---|---|
| 140 (Ex.) | PET | 90 | 80 | — | 9 | 11.5 | 36 | 75/24 | Easy | 44 | None | None | None | 25 |
| 141 (Ex.) | PET | 90 | 80 | — | 7 | 11.5 | 36 | 75/24 | Easy | 49 | None | None | None | 25 |
| 142 (Ex.) | PET | 90 | 80 | 13 | — | 11.5 | 36 | 75/24 | Easy | 42 | None | None | None | 25 |
| 143 (Ex.) | PET | 90 | 80 | — | 9 | 9 | 36 | 75/24 | Easy | 51 | None | None | None | 25 |
| 144 (Ex.) | PET | 90 | 80 | — | 7 | 7 | 36 | 75/24 | Easy | 52 | None | None | None | 25 |
| 145 (Ex.) | PET | 90 | 80 | 13 | — | 7 | 36 | 75/24 | Easy | 56 | None | None | None | 25 |
| 146 (Ex.) | PET | 90 | 80 | — | 7 | 11.5 | 36 | 75/24 | Easy | 44 | None | None | Contained | 0.5 |
| 147 (Ex.) | PET | 90 | 80 | — | 7 | 11.5 | 36 | 75/24 | Easy | 47 | None | None | Contained | 0.5 |
| 148 (Ex.) | PET | 90 | 80 | 13 | — | 11.5 | 36 | 75/24 | Easy | 46 | None | None | Contained | 0.5 |
| 149 (Ex.) | PET | 90 | 80 | — | 9 | 9 | 36 | 75/24 | Easy | 50 | None | None | Contained | 0.5 |
| 150 (Ex.) | PET | 90 | 80 | — | 7 | 7 | 36 | 75/24 | Easy | 54 | None | None | Contained | 0.5 |
| 151 (Ex.) | PET | 90 | 80 | 13 | — | 7 | 36 | 75/24 | Easy | 53 | None | None | Contained | 0.5 |
| 152 (Ex.) | PEN | 85 | 120 | — | 9 | 11.5 | 36 | 110/48 | Easy | 39 | None | None | None | 28 |
| 153 (Ex.) | PEN | 85 | 120 | — | 7 | 11.5 | 36 | 110/48 | Easy | 42 | None | None | None | 28 |
| 154 (Ex.) | PEN | 85 | 120 | 13 | — | 11.5 | 36 | 110/48 | Easy | 37 | None | None | None | 28 |
| 155 (Ex.) | PEN | 85 | 120 | — | 9 | 9 | 36 | 110/48 | Easy | 39 | None | None | None | 28 |
| 156 (Ex.) | PEN | 85 | 120 | — | 7 | 7 | 36 | 110/48 | Easy | 48 | None | None | None | 28 |
| 157 (Ex.) | PEN | 85 | 120 | 13 | — | 7 | 36 | 110/48 | Easy | 46 | None | None | None | 28 |
| 158 (Com.) | PEN | 85 | 120 | — | 2.8 | 2.8 | 36 | 110/48 | Difficult | 248 | Observed | Observed | None | 28 |
| 159 (Com.) | PEN | 85 | 120 | 13 | — | 11.5 | 36 | 35/240 | Difficult | 276 | Observed | Observed | Contained | 0.7 |
| 160 (Com.) | PEN | 85 | 120 | — | 2.8 | 2.8 | 36 | 110/48 | Difficult | 248 | Observed | Observed | None | 28 |
| 161 (Com.) | PEN | 85 | 120 | 13 | — | 11.5 | 36 | 35/240 | Difficult | 277 | Observed | Observed | Contained | 0.7 |
| 162 (Ex.) | PEN | 85 | 120 | — | 9 | 11.5 | 36 | 110/48 | Easy | 39 | None | None | Contained | 0.7 |
| 163 (Ex.) | PEN | 85 | 120 | — | 7 | 11.5 | 36 | 110/48 | Easy | 44 | None | None | Contained | 0.7 |
| 164 (Ex.) | PEN | 85 | 120 | 13 | — | 11.5 | 36 | 110/48 | Easy | 36 | None | None | Contained | 0.7 |
| 165 (Ex.) | PEN | 85 | 120 | — | 9 | 9 | 36 | 110/48 | Easy | 39 | None | None | Contained | 0.7 |
| 166 (Ex.) | PEN | 85 | 120 | — | 7 | 7 | 36 | 110/48 | Easy | 48 | None | None | Contained | 0.7 |
| 167 (Ex.) | PEN | 85 | 120 | — | 7 | 7 | 72 | 110/48 | Easy | 57 | None | None | Con- | 0.7 |

TABLE 13-continued

| Sample No. | Support Kind | Support Thickness (μm) | Support Tg (°C.) | Supply room Diameter Vacant core (mm) | Supply room Diameter Spool (mm) | Patrone Diameter (mm) | Film frame number (sheet) | Heat treatment (°C./hrs) | Tongue end pulling out | Value of Curl (ANSI) | Unevenness in development | Breaking of rear edge | Dye | L.P. (mm) |
|---|---|---|---|---|---|---|---|---|---|---|---|---|---|---|
| 168 (Ex.) | PEN | 85 | 120 | 7 | — | 7 | 72 | 110/48 | Easy | 56 | None | None | Contained | 0.7 |
| 169 (Ex.) | PEN | 85 | 120 | 13 | — | 7 | 36 | 110/48 | Easy | 47 | None | None | Contained | 0.7 |

I claim:

1. A photographic film-incorporated camera comprising a supply room in which an unexposed photographic film drawn from a cylindrical cartridge has been wound up and a wind-up room with which the cylindrical cartridge is enclosed, one exposure of the photographic film drawn from the supply room being fed per a shooting to be wound up in the cylindrical cartridge;

in which the photographic film comprises a photographic layer on a composite of a support and a subbing layer, said composite being obtained by subjecting the support which comprises an aromatic polyester having a glass transition temperature of 70° to 200° C. to heat treatment at a temperature of 40° C. to the glass transition temperature for 0.1 to 1,500 hours before or after forming the subbing layer on the support; wherein the aromatic polyester is derived from ethylene glycol and 2,6- naphthalenedicarboxylic acid; and wherein the photographic film is wound around a spool or vacant core of a diameter of 3 to 12 mm in the supply room.

2. The photographic film-incorporated camera as defined in claim 1, wherein a dye or a pigment is incorporated into the support of the photographic film in such amount that a transmission density of the support is increased by incorporation thereof by 0.005 to 0.2.

3. The photographic film-incorporated camera as defined in claim 2, wherein the dye has the following formula (I):

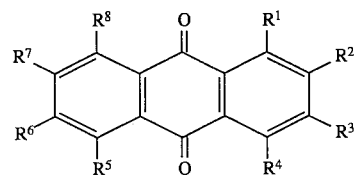

wherein each of $R^1$, $R^2$, $R^3$, $R^4$, $R^5$, $R^6$, $R^7$ and $R^8$ stands for a hydrogen atom, a hydroxyl group, an aliphatic group, an aromatic group, a heterocyclic group, a halogen atom, a cyano group, a nitro group, —$COR^9$, —$COOR^9$, —$NR^9R^{10}$, —$NR^{10}COR^{11}$, —$NR^{10}SO_2R^{11}$, —$CONR^9R^{10}$, —$SO_2NR^9R^{10}$, —$COR^{11}$, —$SO_2R^{11}$, —$OCOR^{11}$, —$NR^9CONR^{10}R^{11}$, —$CONHSO_2R^{11}$ or —$SO_2NHCOR^{11}$, and $R^1$ and $R^2$ or $R^2$ and $R^3$ may be linked each other to form a 5- or 6-membered ring, in which each of $R^9$ and $R^{10}$ represents a hydrogen atom, an aliphatic group, an aromatic group or a heterocyclic group, $R^9$ and $R^{10}$ may be linked each other to form a 5- or 6-membered ring, and $R^{11}$ represents an aliphatic group, an aromatic group or a hetrocyclic group; or the following formula (II):

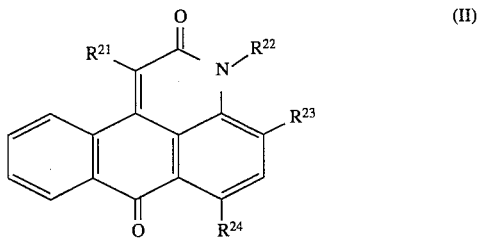

wherein each of $R^{21}$, $R^{23}$ and $R^{24}$ stands for a hydrogen atom, a hydroxyl group, a nitro group, a cyano group, an aliphatic group, an aromatic group, —$COR^{29}$, —$COOR^{29}$, —$NR^{29}R^{30}$, —$NR^{30}COR^{31}$ or —$NR^{30}SO_2R^{31}$, and $R^{22}$ stands for an aliphatic group or an aromatic group, at least one of $R^{21}$, $R^{22}$, $R^{23}$ and $R^{24}$ being a group other than a hydrogen atom, in which each of $R^{29}$ and $R^{30}$ represents the same meaning as defined in $R^9$ and $R^{10}$ of the formula (I) and $R^{31}$ represents the same meaning as defined in $R^{11}$ of the formula (I).

4. The photographic film-incorporated camera as defined in claim 2, wherein the pigment is a carbon black or a compound selected from the group consisting of an oxide, a sulfate, a sulfite, a carbonate, a halide and a nitrate of an alkali metal, an alkali earth metal, Si, Al, Ti or Fe.

5. The photographic film-incorporated camera as defined in claim 4, wherein the pigment is a carbon black or titanium dioxide.

6. The photographic film-incorporated camera as defined in claim 1, wherein the support has a thickness of 50 to 100 μm.

7. The photographic film-incorporated camera as defined in claim 1, wherein the heat treatment is carried out after the subbing layer is formed on the support.

8. The photographic film-incorporated camera as defined in claim 1, wherein the photographic film further has at least one layer selected from the group consisting of a layer comprising a conductive oxide, a layer comprising a sliding agent and a layer comprising a matting agent.

* * * * *